US010235122B1

(12) United States Patent
Goel et al.

(10) Patent No.: US 10,235,122 B1
(45) Date of Patent: Mar. 19, 2019

(54) TRANSITIONING DISPLAYS IN AUTONOMOUS VEHICLES TO INCREASE DRIVER ATTENTIVENESS

(71) Applicant: QUALCOMM Incorporated, San Diego, CA (US)

(72) Inventors: Amit Goel, San Diego, CA (US); Mohammed Ataur Rahman Shuman, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 29 days.

(21) Appl. No.: 15/711,869

(22) Filed: Sep. 21, 2017

(51) Int. Cl.
*G06F 3/14* (2006.01)
*G06F 3/16* (2006.01)
*G06K 9/00* (2006.01)
*H04N 9/31* (2006.01)

(52) U.S. Cl.
CPC ............ *G06F 3/1454* (2013.01); *G06F 3/165* (2013.01); *G06K 9/00791* (2013.01); *H04N 9/3179* (2013.01)

(58) Field of Classification Search
CPC .. G06K 9/00791; H04N 9/3179; G06F 3/165; G06F 3/1454
See application file for complete search history.

(56) References Cited

U.S. PATENT DOCUMENTS

| 8,816,837 | B2 | 8/2014 | Braden |
| 8,914,012 | B2 | 12/2014 | Crosbie et al. |
| 9,423,937 | B2 | 8/2016 | Penilla et al. |
| 2015/0310287 | A1 | 10/2015 | Tseng et al. |
| 2016/0109701 | A1 | 4/2016 | Goldman-Shenhar et al. |
| 2017/0177957 | A1* | 6/2017 | Yokochi ................ H04N 5/77 |
| 2018/0012089 | A1* | 1/2018 | Ricci ..................... H04L 9/321 |
| 2018/0190242 | A1* | 7/2018 | Fujita ................ G02B 27/0149 |
| 2018/0270542 | A1* | 9/2018 | Ramalingam ............ B60R 1/00 |

* cited by examiner

*Primary Examiner* — Muhammad N Edun
(74) *Attorney, Agent, or Firm* — The Marbury Law Group, PLLC

(57) ABSTRACT

Various embodiments include systems and methods of displaying visual infotainment information to a vehicle operator. A processor of an infotainment system may provide visual infotainment information to be displayed on a first display when the infotainment system is operating in a first display mode. The processor may determine whether a change in state or operation of the vehicle is within a predetermined threshold variance while the infotainment system is operating in the first display mode. The processor may transition from the first display mode to a second display mode in response to determining that the change in state or operation of the vehicle is within the predetermined threshold variance and provide the visual infotainment information to be displayed on a second display when the infotainment system is operating in the second display mode in a manner configured to guide the operator's attention to an external environment of the vehicle.

30 Claims, 13 Drawing Sheets

TRANSITIONING DISPLAYS IN AUTONOMOUS VEHICLES TO INCREASE DRIVER ATTENTIVENESS

BACKGROUND

With the implementation of self-driving and advanced driver-assistance systems in vehicles, a vehicle operator will be free from paying constant attention to driving. This will allow the vehicle operator to focus his attention on other activities such as reading, consuming infotainment, etc. However, partial attention to surroundings and vehicle operation may still be desired or required. This is especially the case just prior to when the driver should take over manual control (e.g., when approaching an off ramp or an accident site).

SUMMARY

Various embodiments include methods and systems for displaying visual infotainment information to an operator of a first vehicle. Various embodiments may include rendering the visual infotainment information on a first display when an infotainment system of the first vehicle is operating in a first display mode, determining whether a change in state or operation of the first vehicle is within a predetermined threshold variance while the infotainment system is operating in the first display mode, initiating transition from the first display mode to a second display mode in response to determining that the change in state or operation of the first vehicle is within the predetermined threshold variance, and rendering the visual infotainment information on a second display different from the first display when the infotainment system of the first vehicle is operating in the second display mode in a manner configured to guide the operator's attention to a location where at least partial attention by the operator is appropriate, such as a display where a warning appears or will be presented, or an external environment of the first vehicle.

In some embodiments, rendering the visual infotainment information on the first display may include rendering the visual infotainment information on the first display within an interior of the first vehicle, and the second display may be associated with a second vehicle. In some embodiments, initiating transition from the first display mode to the second display mode may include fading out the visual infotainment information rendered on the first display, and fading in the visual infotainment information rendered on the second display. Some embodiments may further include modifying an audio portion of the infotainment information provided within the vehicle.

In some embodiments, initiating transition from the first display mode to the second display mode may include projecting the visual infotainment information from the first vehicle onto the second vehicle using a projector. Some embodiments may further include controlling the projector to gradually move projected images from a location associated with the first display onto the second vehicle.

Various embodiments may further include the first vehicle being configured to operate in a manual operation mode and an autonomous operation mode. In some embodiments, at least one of the first display mode and the second display mode may occur while the first vehicle is operating in the autonomous operation mode.

Various embodiments further include a motorized vehicle having processor configured with processor executable instructions to perform operations of any of the methods summarized above. Various embodiments further include a processing device for use in a motorized vehicle and configured to perform operations of any of the methods summarized above. Various embodiments include a motorized vehicle having means for performing functions of any of the methods summarized above. Various embodiments include a non-transitory processor-readable storage medium having stored thereon processor-executable instructions configured to cause a processor of a computing device to perform operations of any of the methods summarized above.

BRIEF DESCRIPTION OF THE DRAWINGS

The accompanying drawings, which are incorporated herein and constitute part of this specification, illustrate exemplary embodiments, and together with the general description given above and the detailed description given below, serve to explain the features of the various embodiments.

DETAILED DESCRIPTION

Figure 1:
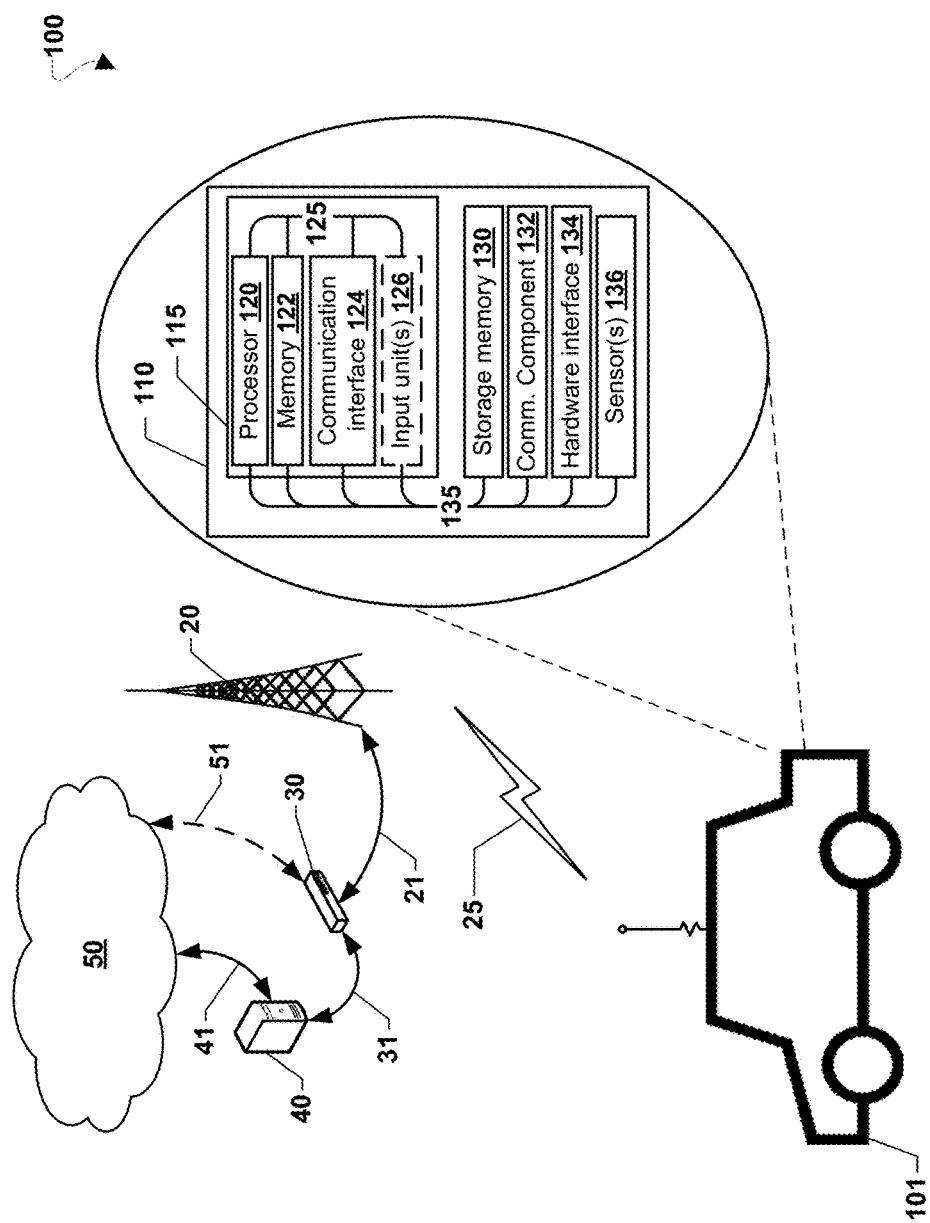
FIG. 1 is a schematic diagram illustrating a vehicle capable of autonomous operation, a communication network, and components thereof.

Various embodiments will be described in detail with reference to the accompanying drawings. Wherever possible, the same reference numbers will be used throughout the drawings to refer to the same or like parts. References made to particular examples and embodiments are for illustrative purposes, and are not intended to limit the scope of the various embodiments or the claims.

Various embodiments include a vehicle configured to use the display of infotainment information on a plurality of displays to transition the gaze of an operator of the vehicle such that the operator's attention or awareness may be guided or steered using the position of the displayed infotainment information. The infotainment system may include any number of display devices or surfaces in various locations and/or positions with respect to the operator's gaze.

The infotainment system may render the infotainment information in or at a variety of locations within and outside the vehicle, and adjust the location where infotainment information is rendered so as to dynamically guide or steer the attention of the operator toward a display or outside the vehicle. In some embodiments, the infotainment system may identify an event, location, or position in which to direct the operator's gaze, identify which display or surface correlates to the identified event, location, or position, and then transition the display of infotainment information from the current display location (e.g., a display rendering the infotainment) to the display or surface that corresponds to the identified event, location, or position. The initial and the selected display location may be any display of the infotainment system, any display surface on which a projector of the infotainment system may project the information, or any location at which the information may be presented in a virtual-reality display (e.g., a virtual-reality headset, projector, cockpit display, etc.).

Various embodiments include a vehicle capable of operating in an autonomous mode and that is equipped with an infotainment system configured to display the infotainment information to an operator of the vehicle based on a desired location or position in which to direct an operator's attention and/or a level of attention appropriate for a current external environment. In various embodiments, the infotainment system may render infotainment information on displays or at particular locations depending on different operating modes of the vehicle, a desired location or position in which to direct an operator's attention and/or a level of attention appropriate for a current situation or external environment of the vehicle.

In various embodiments, operating display modes may include a mode in which minimum attention by the operator is appropriate (referred to herein as a "first display mode"), a mode in which partial attention by the operator is desired (referred to herein as a "second display mode"), and a mode in which full attention by the operator is desired (referred to herein as a "third display mode"). Some embodiments may include a fourth display mode in which no infotainment information is rendered within view of the operator so that the operator is not distracted from attending to vehicle operations. In situations in which the vehicle is in the first display mode but at least partial attention by the operator is or soon will be desired, the infotainment system may transition the display of the infotainment information from one display location to another in a manner that transitions the operator's attention to a display location that will enhance the operator's awareness of a current or changing status of the vehicle and/or the current external environment. For example, in some embodiments, when the operator's attention should be focused on the external environment (e.g., an impending end to autonomous driving mode), the infotainment system may move the display of infotainment information from an interior location (e.g., a display, console or mobile device), to a heads-up display in the windshield, and then onto a display on the vehicle in front of the operator. As another example, the infotainment system may include virtual-reality systems (e.g., virtual-reality headsets, glasses, helmets, or cockpit glass) and the infotainment system may be configured to render infotainment information in a first virtual location (e.g., visible to the operator when looking inside the vehicle) and then move the virtual location at which infotainment information is visible in a manner that leads the operator's vision and attention to a particular direction (e.g., interior monitor or outside the vehicle). A virtual-reality display capability may enable the infotainment system change the virtual-reality location of infotainment information in a continuous (vs. discontinuous) manner.

In some embodiments, the infotainment information may be used to capture the attention of an operator by modifying the display of the infotainment information. For example, the infotainment information may be temporarily paused such that the lack of perception of infotainment information may draw the operator's attention and/or awareness. However, the operator's attention and/or awareness may not be adequately focused and the change in display of the infotainment information may create an undesired distraction for the operator of the vehicle. In addition, the display of infotainment information may be frequently paused and restarted for intervals that may not provide the operator with enough information to adequately consume the infotainment information and/or the display of the infotainment information may be paused for an extended duration that will create a lack of continuity for the operator.

Various embodiments provide an infotainment system of a vehicle with capabilities to determine an operator level attention needed and/or appropriate for a current external environment, and position the visual presentation of infotainment content consistent with the determined operator level attention and/or a location at which the operator's attention should be drawn. In some examples, the infotainment system may configured to position the visual presentation of infotainment content such that displaying the visual portion directs the operator's attention to an event or viewpoint to which the infotainment system has determined the operator should pay at least partial attention. For example, if a processing device of the vehicle determines that a non-emergency condition is present or imminent and only partial attention is needed, the infotainment system may continue to render the infotainment information but transition the presentation of visual content from one display location to another in a manner configured to guide the operator's gaze toward the external environment visible through the windshield. As another example, the infotainment system may shift the display location of the infotainment information to a display or direction within the vehicle to which the operator should pay at least partial attention, such as a console on which a warning is about to be displayed. In this manner, the operator may continue to enjoy the entertainment while being prompted to become more aware of (i.e., pay partial attention to) the external environment, the operating state of the vehicle, etc.

In various embodiment, the infotainment system may operate in a range of display modes, generally referred to herein a first, second, third and fourth modes. For example, the infotainment system may operate in a first display mode that may display infotainment information such that a gaze of the operator is directed to a convenient location for viewing the infotainment information. Such a display location may cause the operator to pay minimum attention to operations of the vehicle and/or the external environment of the vehicle. For example, in the first mode, the infotainment information may be rendered at a location that would require the operator to turn his/her head to see the external environment or a particular console. In another example, the infotainment system may operate in a second mode in which infotainment information may be presented in a display location that brings the external environment or a particular console (or other interior location) into the operator's peripheral vision. Thus, in the second mode, the operator may have partial awareness of the external environment or particular console, and can shift focus the external environment or a particular console merely by refocusing the eyes. In another example, the infotainment system may operate in a third display mode that may render the infotainment information at a display location that directs the gaze of the operator toward the external environment or a particular console requiring the operator's attention, with an number of display modes in-between. In another example, the infotainment system may operate in a fourth mode, the infotainment system may prevent the operator of the vehicle from viewing the infotainment information such that the entertainment does not present a distraction for the operator so that full attention may be directed to operating the vehicle.

In one example of a second display mode, infotainment information may be displayed on a display such that the operator may view the displayed infotainment information and at least a portion of the external environment simultaneously. For example, when an operator's partial attention to the road or external environment is appropriate, the infotainment system may move the display of infotainment information to a display location coincident with the operating environment, thereby dynamically forcing the operator to look outside without sacrificing continuity of display. To ensure that the operator's attention is partially focused on the surrounding operating environment while watching infotainment, the infotainment system may render the infotainment information at a display location so that the operator is looking at or through the windshield or windows of the vehicle to see the infotainment information. For example, the infotainment system may direct the gaze of the operator to the external environment of the vehicle so the operator may become aware of hazards, events, or any other situation where operator attention may be desired. For example, if a pothole or other hazard is detected on the road, the infotainment system may display an alert within the gaze of the operator in the direction of the windshield. Thus, already looking through the windshield to view the entertainment, the operator may see the warning and the view the pothole simply by refocusing his/her eyes. As another example, if another vehicle is detected as approaching the vehicle in a perpendicular manner, the infotainment system may reposition the rendering of the infotainment information so as to direct the gaze of the operator in the direction of the passenger side window or the driver side window.

Various embodiments may include selecting a display on which to render visual infotainment information such that an operator's gaze is in the direction of an event occurring in the environment surrounding the vehicle, e.g. out the windshield or other window of the vehicle. For example, the infotainment information may be rendered on a heads up display or on a rear of a vehicle directly in front of the operator (e.g., on a display on the vehicle via a peer-to-peer wireless communication link or on a surface via a projector). In some embodiments, when the rear part of the vehicle directly in front of the vehicle acts as a screen, the display used to display the infotainment information may have a narrow viewing angle to prevent occupants of other vehicles from seeing the infotainment information. Any infotainment information may be duplicated on other devices within the vehicle for any passengers.

In some embodiments, the infotainment system may include a first electronic display device disposed within the vehicle to render visual infotainment when no operator attention is necessary, a second electronic display device configured to render visual information when partial operator attention is appropriate, and a communication interface configured to communicate with the first electronic display device and the second electronic display device. In some embodiments, the infotainment system may include a projector configured to project infotainment information on various surfaces within and outside the vehicle. In some embodiments, the infotainment system may include a virtual-reality display system (e.g., a headset, helmet, glass, projectors, etc.) configured to present the infotainment information at various virtual locations within and outside the vehicle. A processor of the infotainment system may determine a current or a predicted operating environment. Based on the current/predicted operating environment, the processor may determine the operator level of attention required for the operating environment, and move the rendering of visual infotainment to a display location to cause the operator to have a level of attention in a direction that is appropriate for the operating environment.

In various embodiments, when a current operating environment is determined to require full operator attention, the infotainment system may prevent the display of visual infotainment within the vehicle. When the current operating environment is determined to require no operator attention, the infotainment system may render visual information on a display within the vehicle where the location of the display device may prevent the operator from looking outside the windshield. When a current operating environment is determined to require partial operator attention, the infotainment system may render visual information on a display and in a manner to draw the operator's gaze toward or through the windshield.

The term "vehicle" is used herein to refer to various types of motorized vehicles and heavy equipment. Vehicles may be capable of transporting people, animals, or cargo, particularly vehicles capable of operating in an autonomous and/or semi-autonomous mode. For example, a vehicle may include a motorcycle, an automobile, a truck, a van, a bus, a train or a tram, a boat or ship, and an aircraft including a helicopter, a plane, etc. Vehicles may also include machinery operated by an operator which may include an autonomous and/or semi-autonomous mode, such as a crane (e.g., a sky crane, a gantry crane, a self-propelled crane, etc.), a bulldozer, a grain combine, a tractor, farm machinery, etc. Vehicles may be land base, waterborne or aerial vehicles (e.g., military, commercial and private aircraft).

The term "autonomous vehicle" is used herein to refer to various types of vehicles that include at least a computing device configured to perform autonomous navigation and/or control, automate, adapt, or enhance various vehicle systems (e.g., braking, steering, acceleration, machinery controls, etc.) during at least a portion of operation of the vehicle. For example, an autonomous vehicle may be a self-driving vehicle or a vehicle including an advanced driver-assistance system (ADAS). As another example, an autonomous vehicle may be farm machinery configure to perform a pre-programmed planting, harvesting or plowing operation.

As used herein, the term "computing device" refers to any computing device equipped with at least a processor, such as computers integrated within a vehicle, particularly an autonomous vehicle, but may also include mobile communication devices (e.g., any one or all of cellular telephones, smart-phones, web-pads, tablet computers, Internet enabled cellular telephones, laptop computers, etc.), servers, personal computers, etc. configured to communicate with an autonomous vehicle. In various embodiments, a computing device may be configured with one or more network transceivers or interfaces for establishing communications with other devices. For example, computing devices may include a network interface for establishing a wide area network (WAN) connection (e.g., a Long-Term Evolution cellular network connection, etc.), a short-range wireless connection (e.g., a Bluetooth®, RF, etc.), and/or a local area network (LAN) connection (e.g., a wired or wireless connection to a Wi-Fi® router, etc.).

The term "infotainment information" is used to refer to various types of data, information, media, or content communicated over one or more communication interfaces. Infotainment information may include one or more of text, audio, video, images, animations, interactive content, etc. or any future types of data, information, media, or content. In various embodiments, infotainment information may include email, short message service (SMS), websites, social media, video games, movies, broadcast content, etc. In some embodiments, infotainment information may be limited to entertainment content. However, infotainment information may serve any kind of communication purpose. In some embodiments, infotainment information may be any content or communication that provides information to the operator. For example, the infotainment information may be an alert regarding a status of one or more operating systems of the vehicle. In addition, the infotainment information may correspond to the external environment of a vehicle, such as information associated with weather, traffic, road construction, navigation, location, etc.

Various embodiments may be implemented within a variety of vehicles capable of autonomous operation, which may communicate one or more communication networks, an example of which may be suitable for use with various embodiments is illustrated in FIG. 1. With reference to FIG. 1, a communication system 100 may include one or more autonomous operation capable vehicles 101, a base station 20, one or more remote computing devices 30, one or more remote servers 40, and a communication network 50.

The base station 20 may provide the wireless communication link 25, such as through wireless signals to the vehicle 101. The base station 20 may include one or more wired and/or wireless communications connections 21, 31, 41, 51 to the communication network 50. While the base station 20 is illustrated in FIG. 1 as being a tower, base station 20 may be any network access node including a communication satellite, etc. The communication network 50 may in turn provide access to other remote base stations over the same or another wired and/or wireless communications connection. The remote computing device 30 may be configured to control and/or communicate with the base station 20, the vehicle 101, and/or control wireless communications over a wide area network, such as providing a wireless access points and/or other similar network access point using the base station 20. In addition, the remote computing device 30 and/or the communication network 50 may provide access to a remote server 40. The vehicle 101 may be configured to communicate with the remote computing device 30 and/or the remote server 40 for exchanging various types of communications and data, including location information, navigational commands, data inquiries, infotainment information, etc.

In some embodiments, the remote computing device 30 and/or the remote server 40 may be configured to provide infotainment information to the vehicle 101. For example, the remote computing device 30 and/or the remote server 40 may be associated with a content provider, a website server, a broadcast system, a licensing entity, and/or any other system, service, or entity that contributes to the generation, storage, accessibility, protection, and/or distribution of infotainment information.

The vehicle 101 may include a processing device 110 that may be configured to monitor and control the various functionalities, sub-systems, and/or other components of the vehicle 101. For example, the processing device 110 may be configured to monitor and control various functionalities of the vehicle 101, such as any combination of modules, software, instructions, circuitry, hardware, etc. related to propulsion, power management, sensor management, navigation, communication, actuation, steering, braking, vehicle operation mode management, and/or infotainment display management.

The processing device 110 may house various circuits and devices used to control the operation of the vehicle 101. For example, the processing device 110 may include a processor 120 that directs the control of the vehicle 101. The processor 120 may include one or more processors configured to execute processor-executable instructions (e.g., applications, routines, scripts, instruction sets, etc.) to control operations of the vehicle 101, including operations of various embodiments. In some embodiments, the processing device 110 may include memory 122 coupled to the processor 120 and configured to store data (e.g., navigation plans, obtained sensor data, received messages, applications, etc.). The processor 120 and memory 122, along with (but not limited to) additional elements such as a communication interface 124 and one or more input unit(s) 126, may be configured as or include a system-on-chip (SOC) 115.

The processing device 110 may include more than one SOC 115 thereby increasing the number of processors 120 and processor cores. The processing device 110 may also include processors 120 that are not associated with an SOC 115. Individual processors 120 may be multi-core processors. The processors 120 may each be configured for specific purposes that may be the same as or different from other processors 120 of the processing device 110 or SOC 115. One or more of the processors 120 and processor cores of the same or different configurations may be grouped together. A group of processors 120 or processor cores may be referred to as a multi-processor cluster.

The terms "system-on-chip" or "SOC" as used herein, refer to a set of interconnected electronic circuits typically, but not exclusively, including one or more processors (e.g., 120), a memory (e.g., 122), and a communication interface (e.g., 124). The SOC 115 may include a variety of different types of processors 120 and processor cores, such as a general purpose processor, a central processing unit (CPU), a digital signal processor (DSP), a graphics processing unit (GPU), an accelerated processing unit (APU), a subsystem processor of specific components of the processing device, such as an image processor for a camera subsystem or a display processor for a display, an auxiliary processor, a single-core processor, and a multicore processor. The SOC 115 may further embody other hardware and hardware combinations, such as a field programmable gate array (FPGA), an application-specific integrated circuit (ASIC), other programmable logic device, discrete gate logic, transistor logic, performance monitoring hardware, watchdog hardware, and time references. Integrated circuits may be configured such that the components of the integrated circuit reside on a single piece of semiconductor material, such as silicon.

The SOC 115 may include one or more processors 120. The processing device 110 may include more than one SOC 115, thereby increasing the number of processors 120 and processor cores. The processing device 110 may also include processors 120 that are not associated with the SOC 115 (i.e., external to the SOC 115). Individual processors 120 may be multi-core processors. The processors 120 may each be configured for specific purposes that may be the same as or different from other processors 120 of the processing device 110 or the SOC 115. One or more of the processors 120 and processor cores of the same or different configurations may be grouped together. A group of processors 120 or processor cores may be referred to as a multi-processor cluster.

The processing device 110 may further include one or more sensor(s) 136 that may be used by the processor 120 to determine information associated with vehicle operation and/or information associated with an external environment corresponding to the vehicle 101 to control various processes on the vehicle 101. For example, in some embodiments, the processor 120 may use data from sensors 136 as an input for determining or predicting the external environment of the vehicle 101, for determining operation states of the vehicle 101, and/or modes to display infotainment information. One or more other input units 126 may also be coupled to the processor 120. Various components within the processing device 110 and/or the SOC 115 may be coupled together by various circuits, such as a bus 125, 135 or another similar circuitry.

In various embodiments, the processing device 110 may include or be coupled to one or more communication components 132, such as a wireless transceiver, an onboard antenna, and/or the like for transmitting and receiving wireless signals through the wireless communication link 25. The one or more communication components 132 may be coupled to the communication interface 124 and may be configured to handle wireless wide area network (WWAN) communication signals (e.g., cellular data networks) and/or wireless local area network (WLAN) communication signals (e.g., Wi-Fi signals, Bluetooth signals, etc.) associated with ground-based transmitters/receivers (e.g., base stations, beacons, Wi-Fi access points, Bluetooth beacons, small cells (picocells, femtocells, etc.), etc.). The one or more communication components 132 may receive data from radio nodes, such as navigation beacons (e.g., very high frequency (VHF) omni-directional range (VOR) beacons), Wi-Fi access points, cellular network base stations, radio stations, etc. In some embodiments, the one or more communication components 132 may be further configured to conduct communications with nearby autonomous vehicles (e.g., dedicated short-range communications (DSRC), etc.).

The processing device 110, using the processor 120, the one or more communication components 132, and an antenna may be configured to conduct wireless communications with a variety of wireless communication devices, examples of which include the base station or cell tower (e.g., base station 20), a beacon, server, a smartphone, a tablet, or another computing device with which the vehicle 101 may communicate. The processor 120 may establish a bi-directional wireless communication link 25 via a modem and an antenna. In some embodiments, the one or more communication components 132 may be configured to support multiple connections with different wireless communication devices using different radio access technologies. In some embodiments, the one or more communication components 132 and the processor 120 may communicate over a secured communication link. The security communication links may use encryption or another secure means of communication in order to secure the communication between the one or more communication components 132 and the processor 120.

While the various components of the processing device 110 are illustrated as separate components, some or all of the components (e.g., the processor 120, the memory 122, and other units) may be integrated together in a single device or module, such as a system-on-chip module.

The vehicle 101 may navigate or determine positioning using navigation systems, such as Global Navigation Satellite System (GNSS), Global Positioning System (GPS), etc. In some embodiments, the vehicle 101 may use an alternate source of positioning signals (i.e., other than GNSS, GPS, etc.). The vehicle 101 may use position information associated with the source of the alternate signals together with additional information for positioning and navigation in some applications. Thus, the vehicle 101 may navigate using a combination of navigation techniques, camera-based recognition of the external environment surrounding the vehicle 101 (e.g., recognizing a road, landmarks, highway signage, etc.), etc. that may be used instead of or in combination with GNSS/GPS location determination and triangulation or trilateration based on known locations of detected wireless access points.

In some embodiments, the processing device 110 of the vehicle 101 may use one or more of various input units 126 for receiving control instructions, data from human operators or automated/pre-programmed controls, and/or for collecting data indicating various conditions relevant to the vehicle 101. For example, the input units 126 may receive input from one or more of various components, such as camera(s), microphone(s), position information functionalities (e.g., a global positioning system (GPS) receiver for receiving GPS coordinates), operation instruments (e.g., gyroscope(s), accelerometer(s), compass(es), etc.), keypad(s), etc. The camera(s) may be optimized for daytime and/or nighttime operation.

As described, the processor of the vehicle 101 may be in a separate computing device that is in communication with the vehicle. In such embodiments, communications with the vehicle may be implemented using any of a variety of wireless communication devices (e.g., smartphones, tablets, smartwatches, etc.). Various forms of computing devices may be used to communicate with a processor of a vehicle, including personal computers, wireless communication devices (e.g., smartphones, etc.), servers, laptop computers, etc., to implement the various embodiments.

In various embodiments, the vehicle 101 may be configured to communicate with the server 40 to display infotainment information to an operator of the vehicle. For example, the vehicle 101 may access the server 40 to periodically acquire infotainment information. Alternatively, or in addition, the vehicle 101 may send periodic communications to the server 40. For example, vehicle 101 may send the server 40 a request for infotainment information, periodic operation and/or state information associated with the vehicle, location coordinates, etc.

Figure 2:
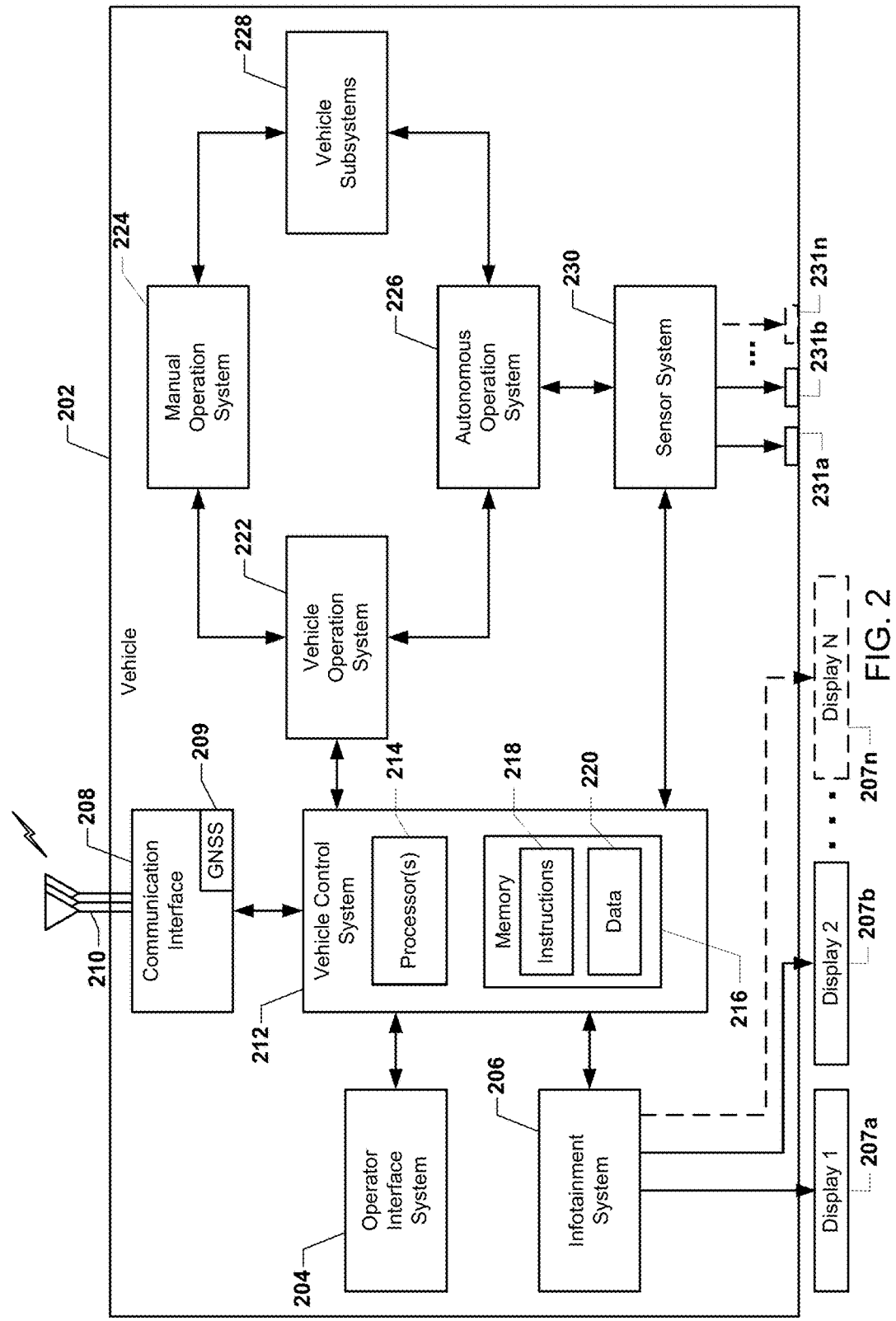
FIG. 2 is a component block diagram of a vehicle capable of autonomous operation, including a system for switching between autonomous operation and manual operation according to various embodiments.

Various embodiments may be implemented within a variety of vehicles capable of autonomous operation, an example of which may be suitable for use with various embodiments is illustrated in FIG. 2. With reference to FIGS. 1 and 2, a vehicle 202 capable of autonomous operation may include an operator interface system 204, an infotainment system 206, a communication interface 208, a vehicle control system 212, a vehicle operation system 222, a manual operation system 224, an autonomous operation system 226, vehicle subsystems 228, and a sensor system 230. In some embodiments, the vehicle 202 may be vehicle 101.

The operator interface system 204 may be configured to receive inputs from and/or provide output communications to an operator of the vehicle 202. The operator interface system 204 may include input elements such as keys, buttons, a touchscreen, a microphone, a camera, etc. and/or output elements such as a display, speakers, etc. to allow the operator of the vehicle 202 to interact with various systems of the vehicle 202 during operation of the vehicle 202.

The infotainment system 206 may be configured to display infotainment information to transition the gaze of the operator such that the operator's attention or awareness may be guided to an environment external to the vehicle 202. In some embodiments, the infotainment system 206 may be coupled to a plurality of displays. For example, as illustrated in FIG. 2, the infotainment system 206 may be coupled to a first display 207a and a second display 207b. In addition, the infotainment system 206 may optionally be coupled to any number of displays including display N 207n.

The communication interface 208 may be configured to communicate with one or more other elements, sensors, communication network nodes, vehicles, or other entities, either directly or via a communication network. The communication interface 208 may be configured to wirelessly communicate using one or more radio access technologies or protocols using one or more antennas 210 and one or more modems corresponding to the one or more antennas (not illustrated). For example, the communication interface 208 may be configured to communicate using Bluetooth, IEEE 802.11, near field communications (NFC), cellular technology such as SGM, CDMA, UMTS, EV-DO, WiMAX, and LTE, ZigBee, dedicated short range communications (DSRC), radio frequency identification (RFID) communications, and any revisions or enhancements of any of the above communication technologies as well as any future wireless communication technologies.

In addition, the communication interface 208 may further include a Global Navigation Satellite System (GNSS). The GNSS may be a satellite-based location or global coordinate determining system for determining the coordinates of the vehicle 202 within a global coordinate system. In addition, the GNSS may include a global positioning system (GPS). In some embodiments, the GNSS may include a transceiver configured to estimate a position of the vehicle 202 with respect to the Earth based on satellite-based positioning data. The vehicle control system 212 may be configured to use the information received by the GNSS in combination with map data stored in memory 216 (e.g., data 220) to estimate a location of the vehicle 202 with respect to a road in which the vehicle 202 is traveling.

The vehicle control system 212 may be configured to control the operation of the vehicle 202. The vehicle control system 212 may include one or more processors 214, one or more memory elements 216, instructions 218, and data 220. The one or more processors 214 may include a general purpose processor and/or a special purpose processor configured to execute the instructions 218 stored in the memory 216. In some embodiments, the one or more processors 214 may use at least a portion of the data 220 stored in the memory 216 during the execution of the instructions 218. The one or more processors 214 may also contain on-board memory (not shown) and may comprise distributed computing functionality. In some embodiments, the vehicle control system 212 may be configured to receive information from and/or control various systems and subsystems of the vehicle 202.

The vehicle operation system 222 may be configured to switch the vehicle between autonomous operation and manual operation. In some embodiments, based on parameters monitored using the sensor system 230 and/or inputs provides at the operation interface system 204, the vehicle control system 212 may instruct the vehicle operation system 222 to control the switching between autonomous operation and manual operation of the vehicle 202. While the vehicle control system 212 is illustrated in FIG. 2 as a separate module, the functions or operations of the vehicle control system 212 may be incorporated into the vehicle control system 212, the manual operation system 224, and/or the autonomous operation system 226.

The manual operation system 224 may be configured to control the vehicle 202 to operate in a manual mode. For example, the manual operation system 224 may control the vehicle based on one or more manual inputs provided by an operator. The one or more manual inputs may be received from the operator via various vehicle subsystem input elements such as a gas pedal, a brake pedal, a steering wheel, etc.

The autonomous operation system 226 may be configured to control the vehicle 202 to operate in an autonomous mode. For example, the autonomous operation system 226 may control the vehicle based on one or more parameters measured using the sensor system 230 without direct operator interaction.

The sensor system 230 may be configured to detect or sense information about an external environment associated with the vehicle 202 and/or information associated with one or more of the vehicle subsystems 228. The sensor system 230 may include a plurality of sensors 231a, 231b, 231n. In addition, the sensor system 230 may further include one or more actuators associated with the plurality of sensors 231a, 231b, 231n such that the actuators may be configured to change or modify a position and/or orientation of one or more of the plurality of sensors 231a, 231b, 231n.

In some embodiments, the sensors of the sensor system 230 configured to detect information about the external environment may include one or more of a camera, a microphone, an ultrasonic sensor, a radio detection and ranging (RADAR) sensor, and a light detection and ranging (LiDAR) sensor. The sensors of the sensor system 230 configured to detect information associated with one or more of the vehicle subsystems 202 may include one or more of a wheel sensor, a speed sensor, a break sensor, a gradient sensor, a weight sensor, a heading sensor, a yaw sensor, a gyroscope sensor, a position sensor, an accelerometer, an autonomous operation forward/reverse sensor, a battery sensor, a fuel sensor, a tire sensor, one or more steering sensors (e.g., sensors associated with the steering wheel and sensors associated with the steering column), an interior temperature sensor, an exterior temperature sensor, an interior humidity sensor, an exterior humidity sensor, an illuminance sensor, a collision sensor, and the like. In addition, the sensor system 230 may further include sensors associated with accessory subsystems such as heating or air conditioning subsystems, window control subsystems, airbag control systems, etc.

The vehicle subsystems 228 may include any subsystems used in operation of the vehicle 202 (e.g. manual and autonomous operation). For example, the vehicle subsystems 228 may include one or more of an engine or motor, an energy source, a transmission, wheels/tires, a steering system, a breaking system, a computer vision system, an obstacle avoidance system, a throttle, etc.

In some embodiments, the engine may include one or more of internal combustion elements, electric motor elements, steam engine elements, gas-electric hybrid elements, or a combination thereof. The energy source may include one or more of fuels, such as gasoline, diesel, propane, ethanol, etc., batteries, solar panels, etc., or a combination thereof. The transmission may include one or more of a gearbox, a clutch, a differential, a drive shaft, axle, etc. The steering system may include one or more of a steering wheel, a steering column, etc. The breaking system may be configured to slow the speed of the vehicle using friction. The computer vision system may be configured to process and analyze images captured by one or more cameras in order to identify objects and/or features of the external environment associated with the vehicle 202. In some embodiments, the computer vision system may use computer vision techniques to map the external environment, track objects, estimate speed of objects, identify objects, etc. The obstacle avoidance system may be configured to identify, evaluate, and avoid or otherwise negotiate obstacles in the external environment of the vehicle 202. The throttle may be configured to control the operating speed and acceleration of the engine and thus the speed and acceleration of the vehicle 202.

Figure 3:
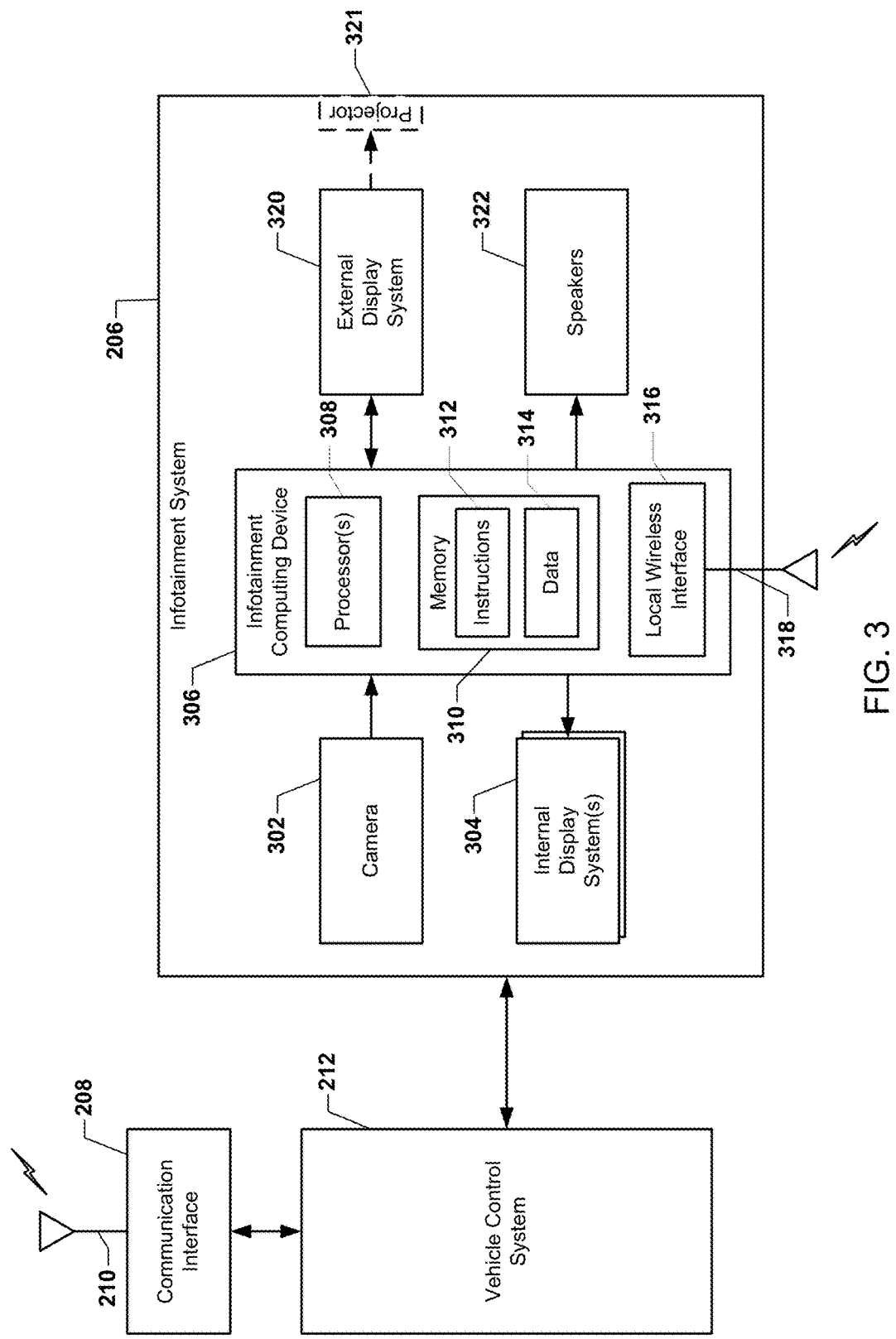
FIG. 3 is a component block diagram of an infotainment system of a vehicle capable of autonomous operation according to various embodiments.
Figure 4:
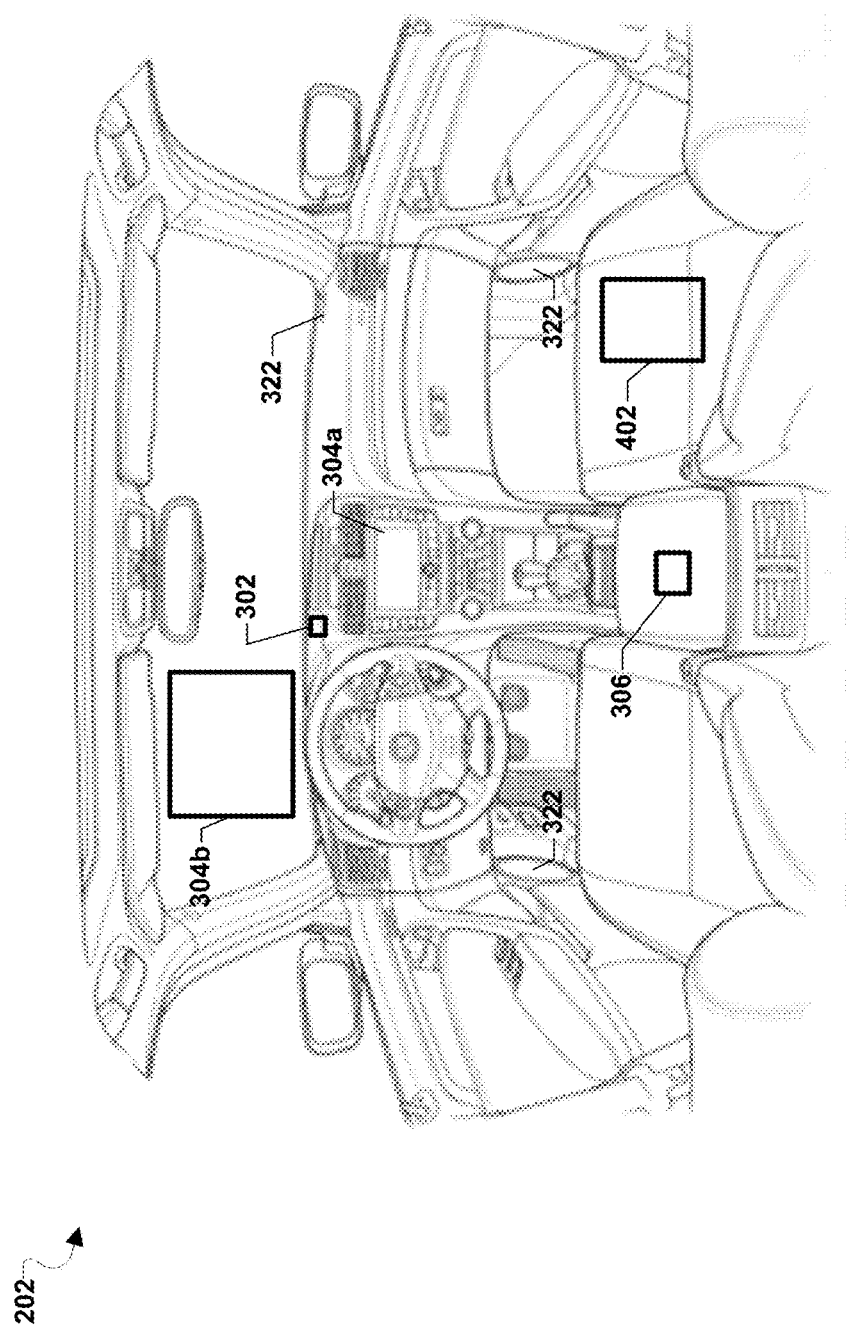
FIGS. 4 and 5 are schematic diagrams illustrating various elements of an infotainment system according to various embodiments.
Figure 5:
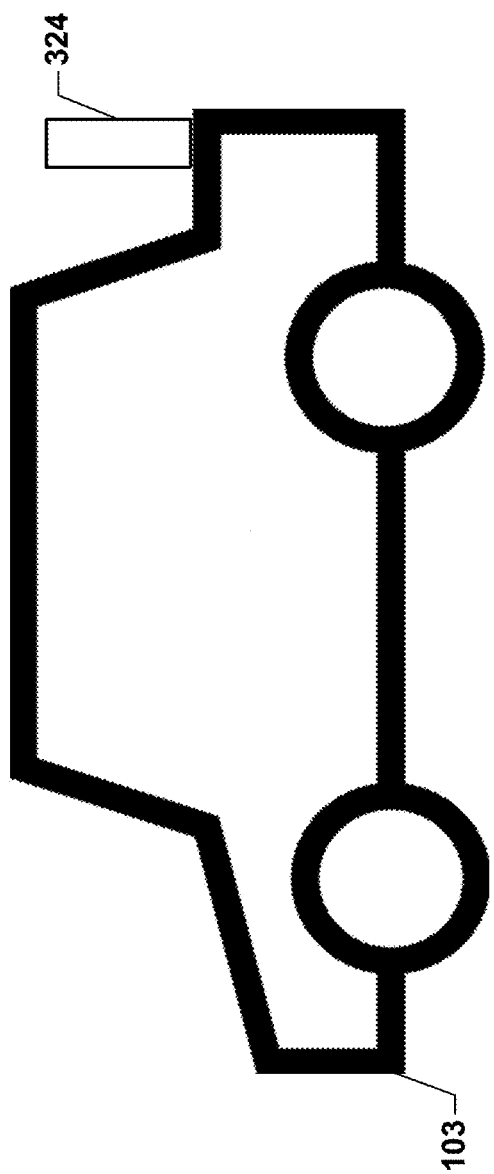

FIGS. 3-5 illustrate various views of an example infotainment system (e.g., 206) according to various embodiments. The infotainment system 206 may be configured to display infotainment information to transition an operator's awareness to an external environment of a vehicle (e.g., 101, 202).

Referring to FIG. 3, the infotainment system 206 may include one or more cameras 302, one or more internal display systems 304, an infotainment computing device 306, an external display system 320, and speakers 322.

The one or more cameras 302 of the infotainment system 206 may be configured to capture images associated with an operator of the vehicle 202, one or more passengers of the vehicle 202, and/or objects in the external environment of the vehicle 202. The one or more cameras 302 may be any type of camera including a camera configured to capture optical images (e.g., high-resolution digital images) and/or infrared images.

Referring to FIG. 4, one or more cameras 302 may be oriented to capture images associated a gaze of the operator of the vehicle 202. In some embodiments, one or more cameras 302 may also be oriented to determine whether any passengers are present in the vehicle 202. Additionally, or in the alternative, another camera 302 may be oriented to capture images of information or objects in the environment external to the vehicle 202. For example, a camera (not shown) oriented to capture images of information or objects in the environment external to the vehicle 202 may capture an image of another vehicle or of an image displayed on a display associated with another vehicle.

The internal display systems 304 may be configured to display infotainment information within the interior of the vehicle 202. The internal display systems 304 may include one or more displays (e.g., 207a, 207b, 207n). The one or more internal display systems 304 may be of various types including, for example, a liquid-crystal display (LCD), a light-emitting diode (LED) display, an organic light-emitting diode (OLED) display, an active-matrix OLED (AMO-LED), a heads-up display (e.g., 304b), etc. Additionally or in the alternative, the one or more internal display systems 304 may include a projector to project an image onto a surface provided within the interior of the vehicle 202.

In some embodiments, an infotainment display system 304 may be a computing device (e.g., a smartphone or tablet) associated with an operator and/or a passenger of the vehicle 202. For example, as illustrated in FIG. 4, one or more of the internal display systems 304 may be a standalone computing device (e.g., a tablet 402) wirelessly coupled to the infotainment computing device 306. Additionally, or in the alternative, as illustrated in FIG. 4, a first internal display system 304a may be formed integrally with the interior of the vehicle 202 such that the first internal display system 304a may be a component of both the infotainment system 206 and another system of the vehicle 202 such as the operator interface system 204.

The infotainment computing device 306 may be configured to display infotainment based on an operator level of attention that corresponds to a current external environment of the vehicle 202. The infotainment computing device 306 may include one or more processors 308, a memory 310 including instructions 312 and data 314, and a local wireless interface 316 including an antenna 318. In some embodiments, the infotainment computing device 306 may be a standalone computing device capable of being removed from the vehicle 202. Alternatively, one or more elements of the infotainment computing device 306 may be integral with the vehicle 202.

The one or more processors 308 of the infotainment computing device 306 may be configured to execute processor-executable instructions 312 to perform operations including determining a desired location or position in which to direct an operator's attention and/or a level of attention appropriate for a current situation or external environment. For example, the one or more processors 308 may determine whether minimum attention, partial attention, or full attention of an operator is desired. In some embodiments, the one or more processors 308 may be configured to predict a future external environment and/or a future level of attention required for a future external environment. The predicted future external environment and/or future level of attention required for a future external environment may be stored as data 314 in the memory 310. Based on the determined level of attention or a desired location or position in which to direct an operator's attention, the infotainment computing device 306 may determine which display or surface of the infotainment system to display the infotainment information. In some examples, the determined display may include a display disposed within an interior of the vehicle or a display disposed external to the vehicle. Alternatively, the infotainment computing device 306 may determine to prevent an operator from viewing infotainment information and discontinue displaying infotainment within a gaze of the operator.

The local wireless interface 316 may be configured to communicate with one or more of the one or more internal display systems 304, the external display system 320, and the communication interface 208. For example, in response to determining an operator level of attention appropriate for the current external environment of the vehicle 202, the infotainment computing device 316 may transmit the infotainment information using the local wireless interface 316 via the wired busses.

The infotainment information may be received by infotainment system (e.g., 206) within the vehicle 202 from a computing device (e.g., 30 or 402) within the vehicle, or a server (e.g., 40) over a wireless communication network (e.g., 50). Alternatively, the infotainment information may be received by the infotainment computing device 306 from one or more computing devices (e.g., 402) within an interior of the vehicle 202. The infotainment information may be received prior to or during operation of the vehicle 202. The infotainment information may be downloaded and stored in the memory 310 until the infotainment computing device determines an operator level of attention required for an operator to view the infotainment information. In some embodiments, the infotainment information may be received by the vehicle 202 at the communication interface 208 such that the infotainment information may be communicated to the infotainment computing device 306 either through wired busses or via the local wireless interface 316. Alternatively, the infotainment information may be received directly at the local wireless interface 316.

The external display system 320 may be configured to display the infotainment information in response to the infotainment computing device 306 determining that the operator level of attention appropriate for the current external environment requires that the operator's gaze be directed through the windshield. The external display system 320 may include a display disposed separate and apart from the vehicle 202. For example, as illustrated in FIG. 5, the external display system 320 may include a display 324 coupled to another vehicle 103. Alternatively, the external display system 320 may optionally include a projector 321 to project infotainment information from the vehicle 202 onto a surface external to the vehicle 202 (e.g., another vehicle, etc.). The projector 321 may be coupled to a motor to allow the projector 321 to dynamically transition a location in which the infotainment information is displayed thus gradually transitioning the gaze of an operator toward the external environment.

In various embodiments, the one or more of the operator interface system 204, the infotainment system 206, the communication interface 208, the vehicle operation system 222, the manual operation system 224, the autonomous operation system 226, the vehicle subsystems 228, the sensor system 230, the camera 302, the one or more internal display systems 304 and the external display system 320 may include elements of hardware, software, or a combination of hardware and software configured to perform certain tasks as described herein. For example, while not illustrated, one or more processors, memory, communication interfaces, displays, etc. may be included within the operator interface system 204, the infotainment system 206, the communication interface 208, the vehicle operation system 222, the manual operation system 224, the autonomous operation system 226, the vehicle subsystems 228, the sensor system 230, the camera 302, the one or more internal display systems 304 and the external display system 320.

Figure 6A:
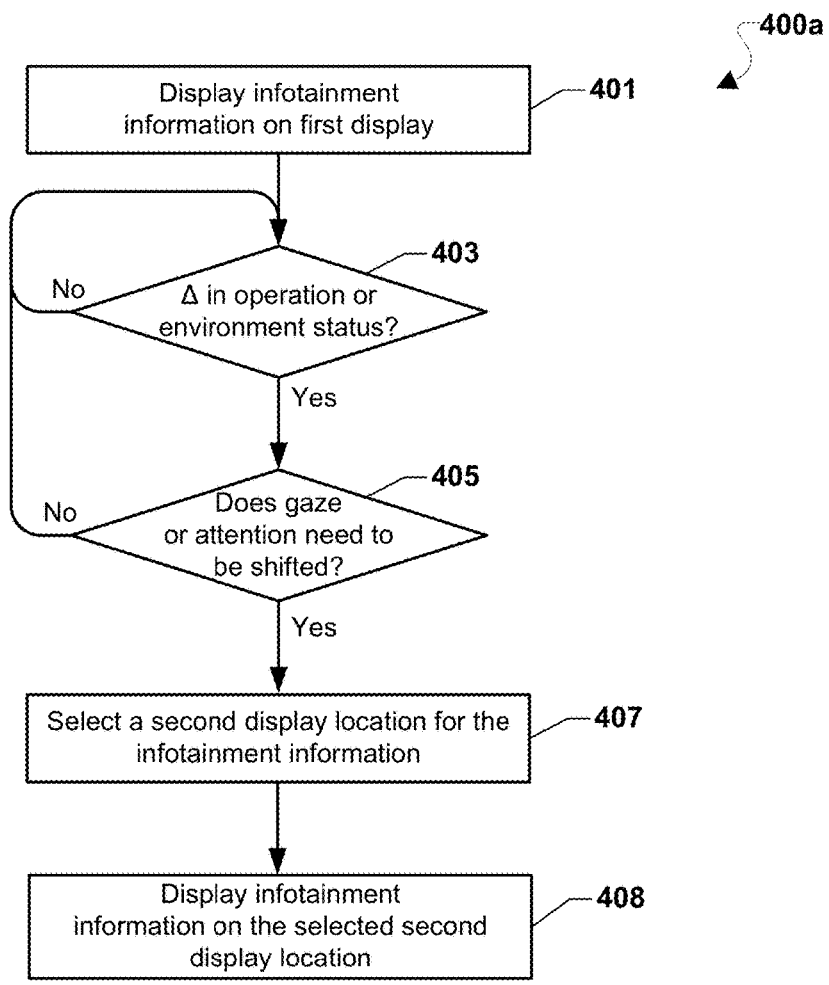
FIG. 6A is a process flow diagram illustrating a method of displaying infotainment according to various embodiments.

FIG. 6A illustrates a method 400*a* of displaying infotainment information according to various embodiments. With reference to FIGS. 1-6A, the method 400*a* may be implemented by a processor within a computing device (e.g., 306) of an infotainment system (e.g., 206) within a vehicle (e.g., 101, 103, 202).

In block 401, the processor may render infotainment information in a first display location. The first display location may be any display associated with the infotainment system or any location or virtual location at which the infotainment system is capable of rendering the information. Rending the infotainment information in block 401 may occur at any point during the time period in which infotainment information is being displayed.

In determination block 403, the processor may determine whether a change in vehicle operation or environment status has happened or may soon occur that may warrant a change in a location or position of the operator's gaze or level of attention. This determination may be based on parameters detected by the sensor system (e.g., 230) and/or inputs received from an operator (e.g., manual input, actuation of gas pedal, brake pedal, steering wheel, etc.). Based on such information, the processor may determine whether a change in parameters has occurred or may soon occur that may warrant a change in gaze location and/or a level of operator awareness.

In response to determining that a change in vehicle operation or environment status has not happened or is not anticipated (i.e., determination block 403="No"), the processor may continue to display the infotainment information at the first display location in block 402 and continue to monitor for changes in vehicle operation or environment status that may warrant a change in gaze location or operator attention in determination block 403.

In response to determining that a change in vehicle operation or environment status has happened or is anticipated (i.e., determination block 403="Yes"), the processor may determine whether the gaze of the operator or a level of attention of the operator needs to be shifted from the first display location to another location.

In response to determining that the gaze or level of attention does not need to be shifted from the first display (i.e., determination block 405="No"), the processor may continue to display the infotainment information on the first display in block 402 and continue to monitor for changes in vehicle operation or environment status that may warrant a change in gaze location or operator attention in determination block 403. In some embodiments, the processor may modify the display of the infotainment information on the first display and/or modify audio outputs of the infotainment system in order to communicate that a change in vehicle operation or environment status has changed.

In response to determining that the gaze or level of attention needs to be shifted from the first display (i.e., determination block 405="Yes"), the processor may select an another (i.e., second) display location for the infotainment information that corresponds to a location or direction in which operator's attention should be directed in block 407. The selected second display location may be any display of the infotainment system 206, any display surface on which a projector of the infotainment system 206 may project the information, or any location at which the information may be presented in a virtual-reality display (e.g., a virtual-reality headset, projector, cockpit display, etc.).

In some embodiments, the processor may transition the display of the infotainment information over one or more displays (other than the first display and the display corresponding to the selected display location) or through a series of display locations such that the display of infotainment information may guide the operator's gaze or attention from the first display location to the selected second display location. For example, the processor may identify a visual path from the first display location and the selected second display location. The processor may then identify one or more displays or display locations within the identified path such that the infotainment information appears to gradually or incrementally move between displays, display surfaces or virtual display locations until finally reaching the selected second display location identified in block 407. During the transition, the infotainment information may overlap or be simultaneously displayed on adjacent displays within the visual path for a time period in order to prevent discontinuity or undesirable interruption of infotainment consumption.

In block 409, the processor may render the infotainment information at the selected second display location.

Figure 6B:
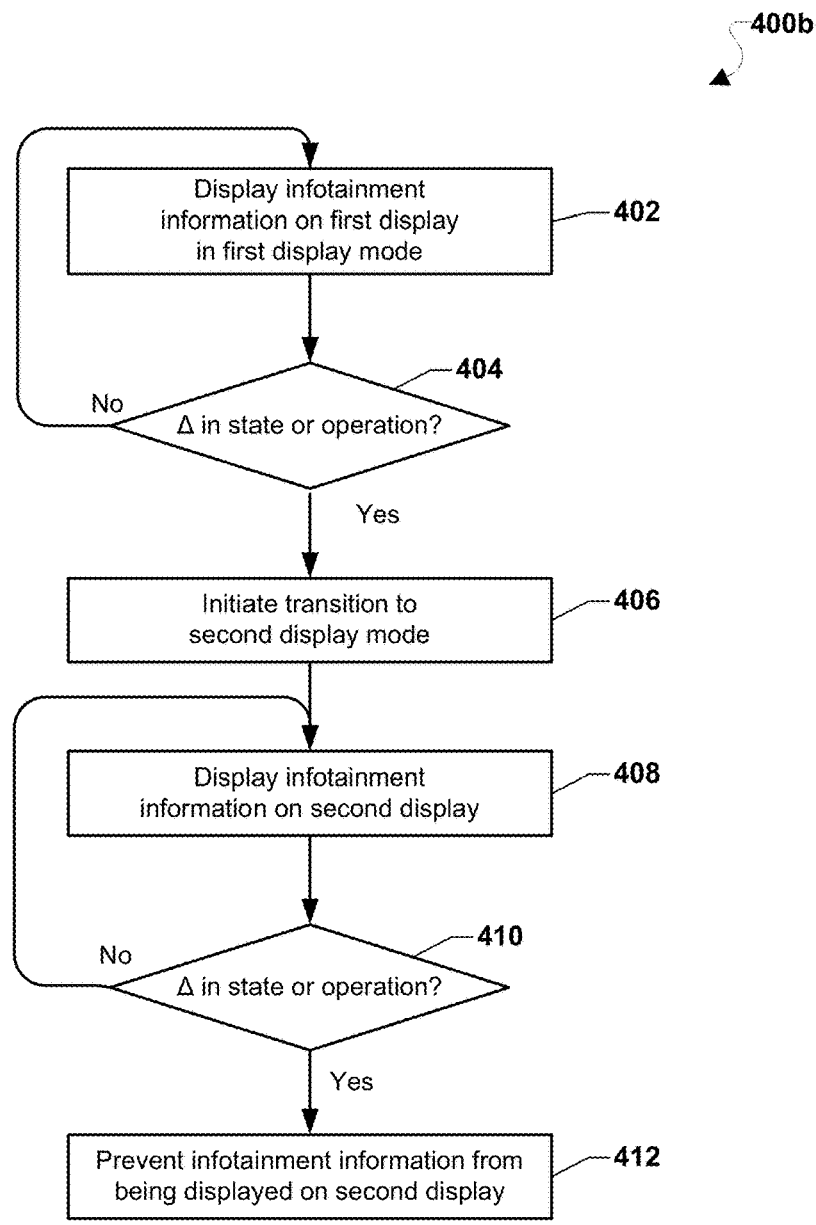
FIG. 6B is a process flow diagram illustrating another method of displaying infotainment according to various embodiments.

FIG. 6B illustrates another method 400*b* of displaying infotainment information according to various embodiments. With reference to FIGS. 1-6B, the method 400*b* may be implemented by one or more processors of a vehicle (e.g., 101, 103, 202).

In block 402, infotainment information may be displayed on a first display or at a first display location while the infotainment system operates in a first display mode. For example, in response to determining that the level of awareness appropriate for the current external environment does not require an operator to gaze out the windshield (e.g., little to no operator attention required), the processor may render the infotainment information at a display location (e.g., a display of an internal display system (e.g., 304)) such that the operator of the vehicle may view the infotainment information without being aware of the external environment. For example, infotainment information may be displayed such that the gaze angle of the operator is in the range of 25-90 degrees below the windshield.

In determination block 404, the processor may determine whether a change in awareness state or vehicle operation has happened or may soon occur. This determination may be based on parameters detected by the sensor system 230 and/or inputs received from an operator (e.g., manual input, actuation of gas pedal, brake pedal, steering wheel, etc.). Based on such information, the processor may determine whether a change in parameters associated with a level of awareness appropriate for a current external environment or a change in vehicle operation from autonomous operation mode to manual mode has happened or may soon occur.

In response to determining that a change in awareness state or vehicle operation has not happened or is not anticipated (i.e., determination block 404="No"), the processor may continue to display the infotainment information on the first display or at the first display location in block 402.

In response to determining that a change in awareness state or vehicle operation has happened or is anticipated (i.e., determination block 404="Yes"), the processor may initiate a transition to a second display mode in block 406. In some embodiments, the transition to second display mode may include modifying various aspects of the infotainment information. For example, the audio and/or video components of the infotainment information may be slowly faded out and transitioned such that the audio information is provided to a different speaker and the video information is provided to a different display (e.g., a second display different from the first display). Alternatively, or in addition, instructions may be superimposed on the first display informing the operator that the display is being transitioned to a second device and operator should continue viewing the infotainment information on the second device. The decision on how to transition the audio/video may also be based on the meta-data available (or determined by processor) on or within the content of the infotainment. For example, loud music and a news broadcast may be handled differently.

In block 408, the infotainment information may be displayed on a second display or at a second display location in response to transitioning to the second display mode. For example, the infotainment information may be displayed such that the gaze angle of the operator may allow the operator to gaze out the windshield or a window of the vehicle and the operator's attention is transitioned to the external environment. In some embodiments, the infotainment information may be discontinued from being displayed on the first display after the transition to the second display mode is complete.

In determination block 410, the processor may determine whether a change in awareness state or vehicle operation has occurred while the infotainment information is displayed on the second display during the second display mode. The determination of whether a change in awareness state or vehicle operation has occurred may be based on parameters detected by the sensor system 230 and/or inputs received from the operator.

In response to determining that a change in state is not detected (i.e., determination block 410="No"), the processor may continue to display the infotainment information on the second display or at the second display location in block 408.

In response to determining that a change in state is detected (i.e., determination block 410="Yes"), the processor may prevent the infotainment information from being displayed on the second display or at the second display location in block 412. In some embodiments, the processor may turn off the second display.

While only two displays are discussed with respect to method 400, three, four, five, or more displays may be included in the infotainment system and the operations in blocks 408-412 may be repeated for each of the multiple displays or display locations so as to transition an operator's gaze from a position that does not require that the operator provide direct attention to a particular console or the external environment to a position in which the operator's attention and/or awareness is directed to the external environment or the particular console. The more displays that are implemented, the more gradual the transition of attention may be implemented by the infotainment system. In a virtual-reality display system, rendering of the infotainment information may be smoothly panned from a first display location to a final display location in a manner that causes the operator to turn his/her head and/or eyes to follow the displayed content.

In some embodiments, the infotainment system may analyze images of the operator obtained by one or more cameras within the vehicle to determine the gaze angle of the operator, and the infotainment system may render visual infotainment information on particular displays based on the determined gaze angle of the operator. For example, the determined gaze angle of the operator may be used to determine whether the operator is still viewing the infotainment information on a particular display, and in response to determining that the operator is no longer looking at a display in which the infotainment information is subsequently displayed, the processor may prevent the visual infotainment information from being rendered on a first display while the visual infotainment information is being rendered on a second display adjacent to and within the same direction and/or field of view of the operator.

Figure 7:
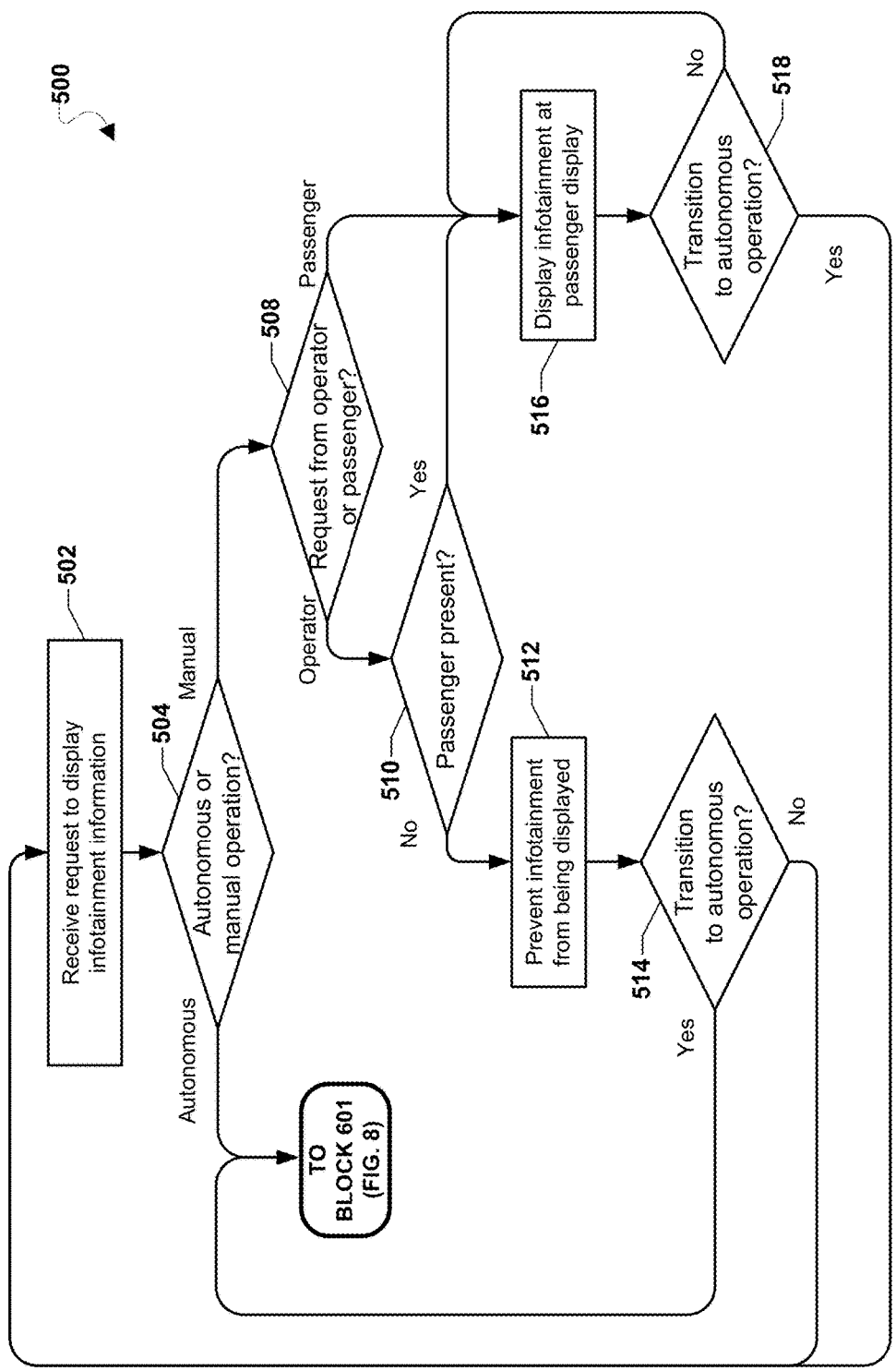
FIGS. 7-9 are process flow diagrams illustrating another method of displaying infotainment information according to various embodiments.
Figure 8:
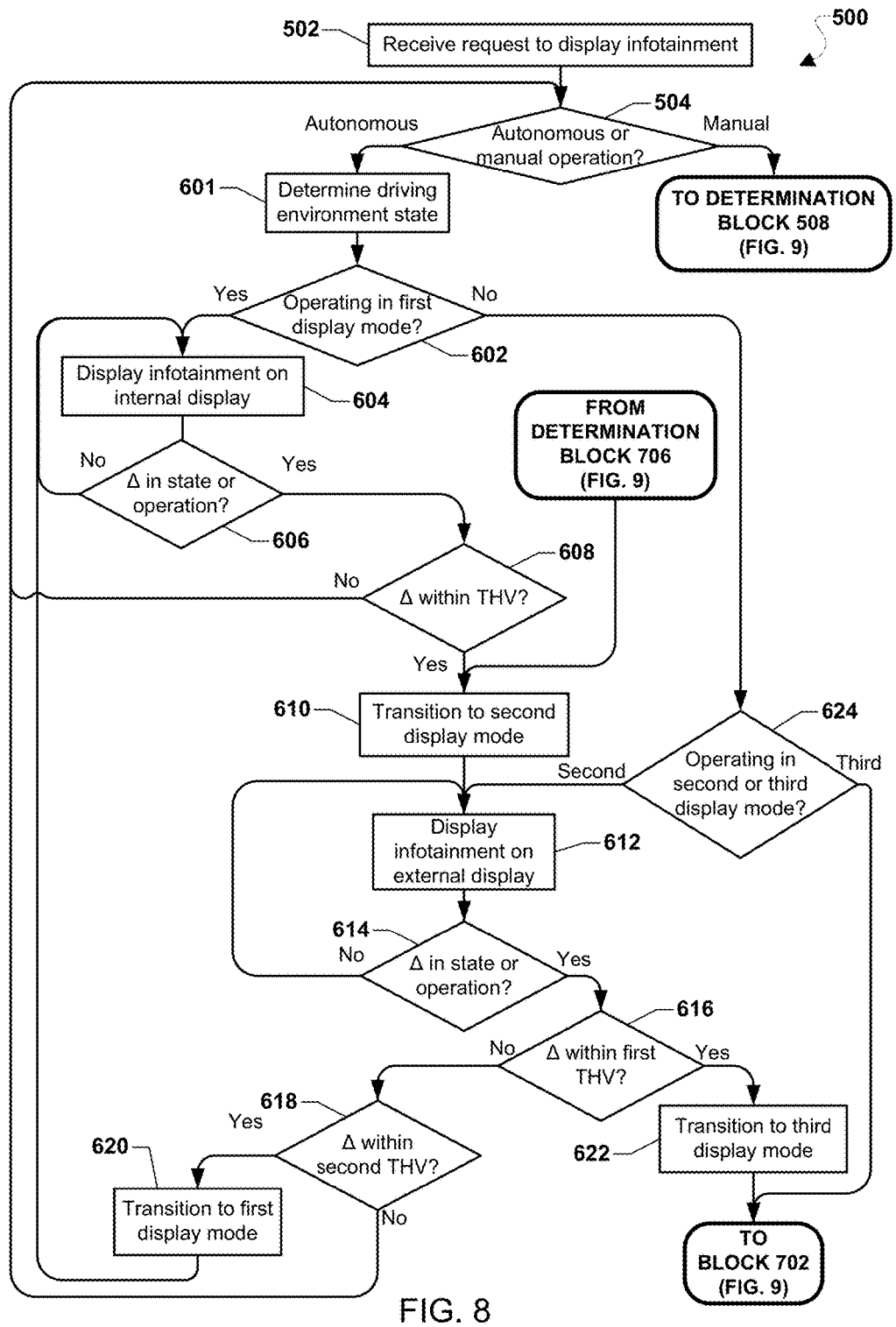
Figure 9:
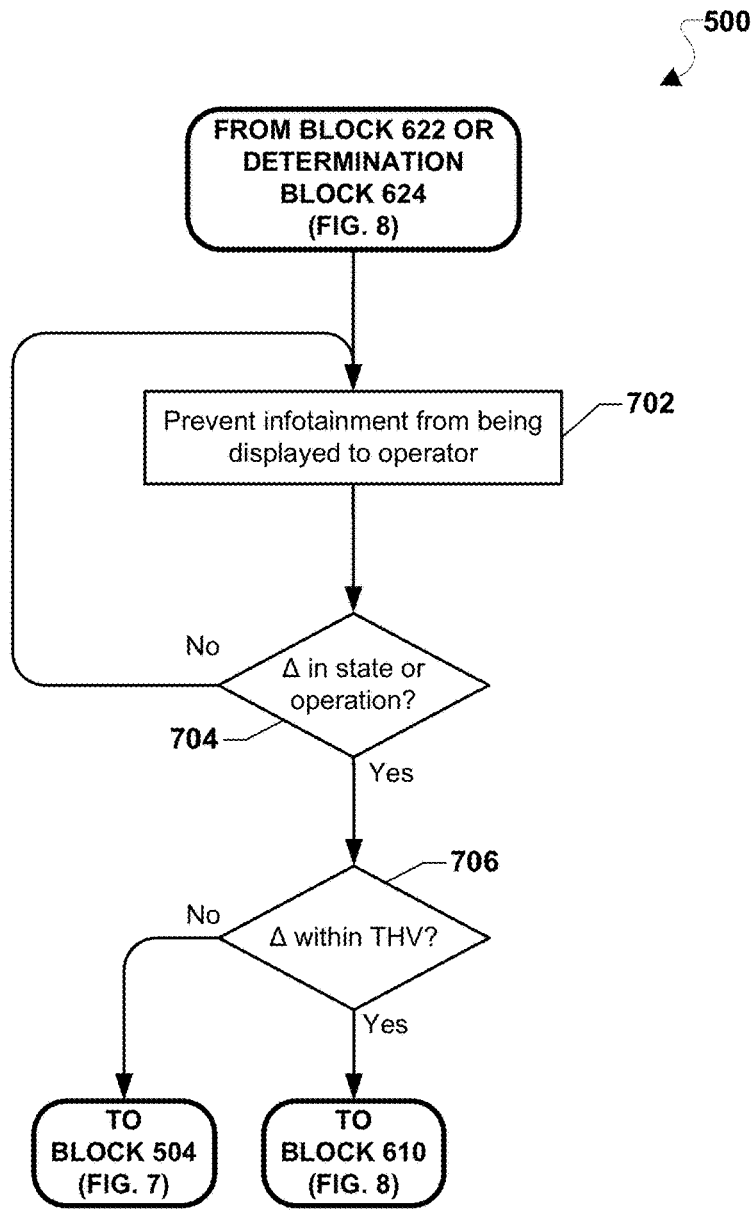

FIGS. 7-9 illustrate a method 500 of displaying infotainment according to various embodiments. With reference to FIGS. 1-9, the method 500 may be implemented by one or more processors of an infotainment system for use in a vehicle (e.g., 101, 103, 202).

In block 502, the processor may receive a request to display infotainment information. The request may be provided as an input on an operator interface system 204 or the infotainment computing device 306. Alternatively, the request may be generated in response to the infotainment system 206 receiving the infotainment information.

In determination block 504, the processor may determine whether the vehicle is currently operating in an autonomous operation mode or a manual operation mode.

In response to determining that the vehicle is currently operating in an autonomous operation mode (i.e., determination block 504="Autonomous"), the processor may determine an operating environment state in block 601 as described with reference to FIG. 8.

In response to determining that the vehicle is currently operating in a manual operation mode (i.e., determination block 504="Manual"), the processor may determine whether the request was from the operator of the vehicle or a passenger in determination block 508.

In response to determining that the request was provided by the operator (i.e., determination block 508="Operator"), the processor may determine whether a passenger is currently present in the vehicle determination block 510.

In response to determining that a passenger is not currently present in the vehicle (i.e., determination block 510="No"), the processor may prevent infotainment information from being displayed to the operator of the vehicle in block 512.

In determination block 514, the processor may determine whether to transition from the manual operation mode to the autonomous operation mode. The processor may determine whether to transition to the autonomous operation mode in various ways. For example, a determination to transition to autonomous mode may be based on one or more of parameters detected by the sensor system 230, the current and/or a predicted external environment associated with the vehicle, a predetermined time period without a change in manual operations, etc.

In response to determining to initiate transitioning from the manual operation to the autonomous operation (i.e., determination block 514="Yes"), the processor may determine the operating environment state of the vehicle in block 601 as described with reference to FIG. 8.

In response to determining not to initiate transitioning from the manual operation to the autonomous operation (i.e., determination block 514="No"), the processor may await another request to display infotainment information in block 502.

In response to determining that the request to display infotainment is received from a passenger of the vehicle (i.e., determination block 508="Passenger"), or in response to determining that at least one passenger is currently present in the vehicle (i.e., determination block 510="Yes"), the processor may display the infotainment information at a device associated with one or more passengers in block 516. In some embodiments, the processor may simultaneously prevent the infotainment information from being displayed to the operator and display the infotainment information at the device associated with the one or more passengers. When more than one passenger is present in the vehicle, the processor may provide the same infotainment information to a device associated with each passenger or to a single display on which all passengers may view the infotainment information. Alternatively, the processor may provide different infotainment information to a device associated with each passenger.

In determination block 518, the processor may determine whether the vehicle should transition from the manual operation mode to the autonomous operation mode. In response to determining that the vehicle should not to transition to the autonomous operation mode (i.e., determination block 518="No"), the processor may continue to display infotainment information at the passenger device in block 516. In response to determining that the vehicle should transition to the autonomous operation mode (i.e., determination block 518="Yes"), the processor may await a subsequent request to display infotainment information in block 502.

Referring to FIG. 8, in response to determining that the vehicle is currently operating in autonomous mode (i.e., determination block 504="Autonomous"), the processor may determine an operating environment state in block 601. The operating environment state may correspond to a current external environment and/or a predicted external environment associated with the vehicle. The processor may consider various factors in determining the operating environment state. For example, the processor may use information associated with operating conditions, road conditions, traffic conditions, weather conditions, location information, etc. detected using various sensors of the sensor system 230. In some embodiments, the processor may determine a state of the road surface (e.g., dry, slippery, icy, tacky, etc.), whether a pothole or other obstruction is within a predetermined distance of the vehicle, whether road construction is present within a predetermined distance of the vehicle, whether the vehicle is passing through a congested area or a street, whether the vehicle will be taking an exit, merging into traffic, making a right/left hand turn, whether snow, leaves, debris, etc. are present on the road.

In determination block 602, the processor may determine whether the infotainment system may operate in a first display mode. The first display mode may allow the operator to consume infotainment information without having to gaze outside the windshield or window of the vehicle.

In response to determining that the infotainment system may operate in the first display mode (i.e., determination block 602="Yes"), the processor may display the infotainment information on a display such that the operator views the infotainment information on a display provided within the interior of the vehicle in block 604. For example, the operator may view the infotainment information without gazing outside the windshield or window of the vehicle such that the gaze angle of the operator is not required to be 0 degrees. Instead, the gaze angle of the operator may be in the range of 25-90 degrees below the 0 degree gaze angle. When the infotainment information is provided to the operator on a display provided within the interior of the vehicle, the operator may be prevented from having any awareness of the external environment. For example, a location and/or position of the display in which the infotainment information is displayed may not require that the operator to gaze in a direction to simultaneously view the external environment of the vehicle and the display displaying the infotainment information. When the infotainment system operates in the first display mode, the display of infotainment information does not impede or prevent an operator from gazing outside the windshield or window of the vehicle.

In determination block 606, the processor may determine whether a change in awareness state or vehicle operation is detected. For example, based on parameters detected by the sensor system 230 and/or inputs received from an operator (e.g., manual input, actuation of gas pedal, brake pedal, steering wheel, etc.), the processor may determine whether a change in parameters associated with a level of awareness appropriate for a current external environment or a change in vehicle operation from autonomous operation mode to manual mode is detected.

In response to determining that a change in awareness state or vehicle operation is not detected (i.e., determination block 606="No"), the processor may continue to display infotainment information on an internal display in block 604.

In response to determining that a change in awareness state or vehicle operation is detected (i.e., determination block 606="Yes"), the processor may determine whether the amount of change is within a threshold variance in determination block 608. The threshold variance may be a predetermined value or a range of values that indicate an increase in the level of awareness that is required of the operator. For example, one or more sensors 231*a*, 231*b*, 231*n* of the sensor system 230 may detect a change in the traffic pattern such that unanticipated or unpredictable traffic congestion is detected. Alternatively, the sensors 231*a*, 231*b*, 231*n* may detect a change in the weather surrounding the vehicle (e.g., rain, wind, snow, ice, temperature, barometric pressure, etc.).

In response to determining that the change in state or operation is not within the threshold variance (i.e., determination block 608="No"), the processor may continue to determine whether the vehicle is operating in autonomous mode or manual mode determination block 504.

In response to determining that the change in state or operation is within the threshold variance (i.e., determination block 608="Yes"), the processor may transition to a second display mode in block 610.

When the processor transitions from the first display mode to the second display mode in block 610, rendering of visual infotainment information may be transitioned from display to display in a manner configured to gradually lead the operator's attention and/or awareness towards the external environment. For example, the video/image portion of the infotainment information may be caused to fade out on a first display and to fade into a second display. Alternatively, or in addition, a subtext may be superimposed onto the first display to instruct the operator to look to a different display should the operator desire to continue viewing the infotainment information.

The audio portion of the infotainment information may also be adjusted to aid in transitioning the attention of the operator. For example, the volume and delay of sound emitted from the speakers 322 of the vehicle 202 may be adjusted in a surround sound audio mode to give an effect that the sound source is moving from an internal display device towards an external display device. In some embodiments, the audio effect may change depending on the number of speakers in the vehicle. For example, the processor may implement a "Hall effect" such that the source of audio may not be readily apparent to the operator in order to avoid confusion caused from different audio and video source locations. While the audio portion of the infotainment information is modified such that the operator may detect a change in the audio portion of the infotainment information, the audio portion may continue to be transmitted within the interior of the vehicle when the visual infotainment information is rendered on the external display.

In some embodiments, sounds detected in the external environment (e.g., heavy rain, thunder, traffic, etc.) may be captured using an external microphone. The captured sound may be mixed and played with the audio infotainment information to gradually transition the operator's attention and/or awareness to the current external environment.

In various embodiments, transitioning from the first display mode to the second display mode may include projecting the visual infotainment information onto windshield, window, or an external surface using a projector. The infotainment information projector may be mounted and motorized such that the visual infotainment information may be displayed to gradually transition the operator's gaze towards a car windshield, window, or an external surface. For example, the infotainment information may be gradually moved or scanned in a direction away from a point adjacent to the first display in a direction towards the external display. In some embodiments, once the operator's gaze is confirmed to be looking in a direction corresponding to the external display, the projector may gradually fade out and the infotainment information may be faded into the external screen in order to transition the attention or awareness of the operator from the first, internal display to the second, external display.

In block 612, the processor may display the infotainment information on an external display. The infotainment information may be displayed on the external display during or after the transition to the second display mode is complete.

In some embodiments, the infotainment computing device 306 may provide the infotainment information to an internal display of an internal display system 304 when the infotainment system 206 is operating in the first display mode. For example, the infotainment computing device 306 may stream both the audio and video portions of the infotainment information using a communication protocol such as MirrorLink™. While the infotainment system 206 is operating in the first display mode, the operator's attention and/or awareness may be directed or focused on the internal display system 304. During the transition to the second display mode in block 610, the processor may dynamically pair the infotainment system 206 with an external display. For example, the infotainment computing device 306 may discover the external display. In some embodiments, the external display may be configured to communicate using WiFi Direct™ or Miracast™ in order to display information transmitted from a computing device in close proximity. The infotainment computing device 306 may discover the external device using various discovery techniques (e.g., bacons, scanning, etc.).

After the infotainment computing device 306 discovers the external device, the infotainment computing device 306 may initiate pairing with the external device. In some embodiments, the external device may display an image including pairing information. For example, the external device may display a challenge code, an alphanumeric string, or a quick response (QR) code. In some embodiments, one or more cameras may capture an image of the challenge code, alphanumeric string, or QR code to confirm pairing. Alternatively, an operator or a passenger of the vehicle may input information associated with the challenge code, alphanumeric string, or QR code displayed on the external display (e.g., via the operator interface system 204 or the infotainment computing device 306) to confirm pairing.

In response to successfully pairing the infotainment computing device 306 with the external display, the infotainment computing device 306 may initiate the transition of rendering of visual infotainment information from the internal display to the external display in block 612. For example, the infotainment computing device 306 may continue to stream the audio portion of the infotainment information to the speakers. In addition, the infotainment computing device 306 may stream video to the external display using technology such as Miracast™. By transitioning the display of infotainment information from the internal display to the external display, the infotainment computing device 306 gradually transitions the operator's attention and/or awareness to the external environment appropriate for the vehicle by leading the operators gaze from the internal display to the external display.

In some embodiments, the external display may be configured to have a narrow viewing angle (similar to laptop privacy screen) in order to prevent operators and/or passengers in vehicles within a predetermined distance of the vehicle 202 from viewing the infotainment information associated with the operator of the vehicle 202.

In determination block 614, the processor may determine whether a change in awareness state or vehicle operation is detected. In response to determining that no change in awareness state or vehicle operation is detected (i.e., determination block 614="No"), the processor may continue to display the infotainment information on the external display block 612.

In response to determining that a change in awareness state or vehicle operation is detected (i.e., determination block 614="Yes"), the processor may determine whether the change in the awareness state or the vehicle operation is within a first threshold variance in determination block 616.

In response to determining that the change in the awareness state or the vehicle operation is not within the first threshold variance (i.e., determination block 616="No"), the processor may determine whether the change in the awareness state or the vehicle operation is within a second threshold variance in determination block 618.

In response to determining that the change in the awareness state or the vehicle operation is within the second threshold variance (i.e., determination block 618="Yes"), the processor may transition to the first display mode in block 620. For example, the processor may transition rendering the infotainment information on the external display to rendering the infotainment information on an internal display of an internal display system 304 in block 604.

In response to the processor determining that the change in the awareness state or the vehicle operation is not within the second threshold variance (i.e., determination block 618="No"), the processor may again determine whether the vehicle is currently operating in the autonomous operation mode or the manual operation mode determination step 504.

In response to determining that the change in the awareness state or the vehicle operation is within the first threshold variance (i.e., determination block 616="Yes"), the processor may transition to a third display mode in block 622. The third display mode may provide the operator the opportunity to direct full attention and/or awareness to the external environment. For example, if the sensor system is sensing or detecting parameters that would indicate that it is likely that the vehicle will have to transition from autonomous operation to manual operation mode soon or if the infotainment computing device 306 predicted that the external environment associated with the current location of the vehicle would require the operator's heightened alertness and/or awareness of the external environment of the vehicle, the processor may initiate transitioning from the second display mode to the third display mode.

In response to determining that the infotainment system should not operate in first display mode (i.e., determination block 602="No"), the processor may determine whether the infotainment system may operate in the second display mode or the third display mode in determination block 624.

In response to determining that the infotainment system may operate in the second display mode (i.e., determination block 624="Second"), the processor may display the infotainment information on the external display in block 612.

In response to determining that the infotainment system may operate in the third display mode (i.e., determination block 624="Third"), the processor may prevent visual infotainment information from being displayed to the operator in block 702 illustrated in FIG. 9. Referring to FIG. 9, the processor may discontinue transmitting the infotainment information to the external display in block 702. Alternatively, the processor may turn off a display viewable by the operator in block 702 to prevent undesired distraction of the operator. In some embodiments, if one or more passengers are present in the vehicle when the infotainment system 206 is transitioned to operating in the third display mode from the second display mode, the processor may continue to display the visual infotainment information to the passengers while preventing the operator from viewing the infotainment information.

In determination block 704, the processor may determine whether a change in the awareness state or vehicle operation is detected. In response to determining that no change in the awareness state or vehicle operation is detected (i.e., determination block 704="No"), the processor may continue to prevent infotainment information from being displayed to the operator in block 702. In response to determining that a change in the awareness state or vehicle operation is detected (i.e., determination block 704="Yes"), the processor may determine whether the change in awareness state or vehicle operation is within a predetermined threshold variance in determination block 706.

In response to determining that the change in the awareness state or the vehicle operation is not within the predetermined threshold variance (i.e., determination block 706="No"), the processor may again determine whether the vehicle is currently operating in the autonomous operation mode or the manual operation mode in block 504 (FIG. 7) as described.

In response to processor determining that the change in the awareness state or the vehicle operation is within the predetermined threshold variance (i.e., determination block 706="Yes"), the processor may transition to the second display mode in block 610 (FIG. 8) as described.

Figure 10:
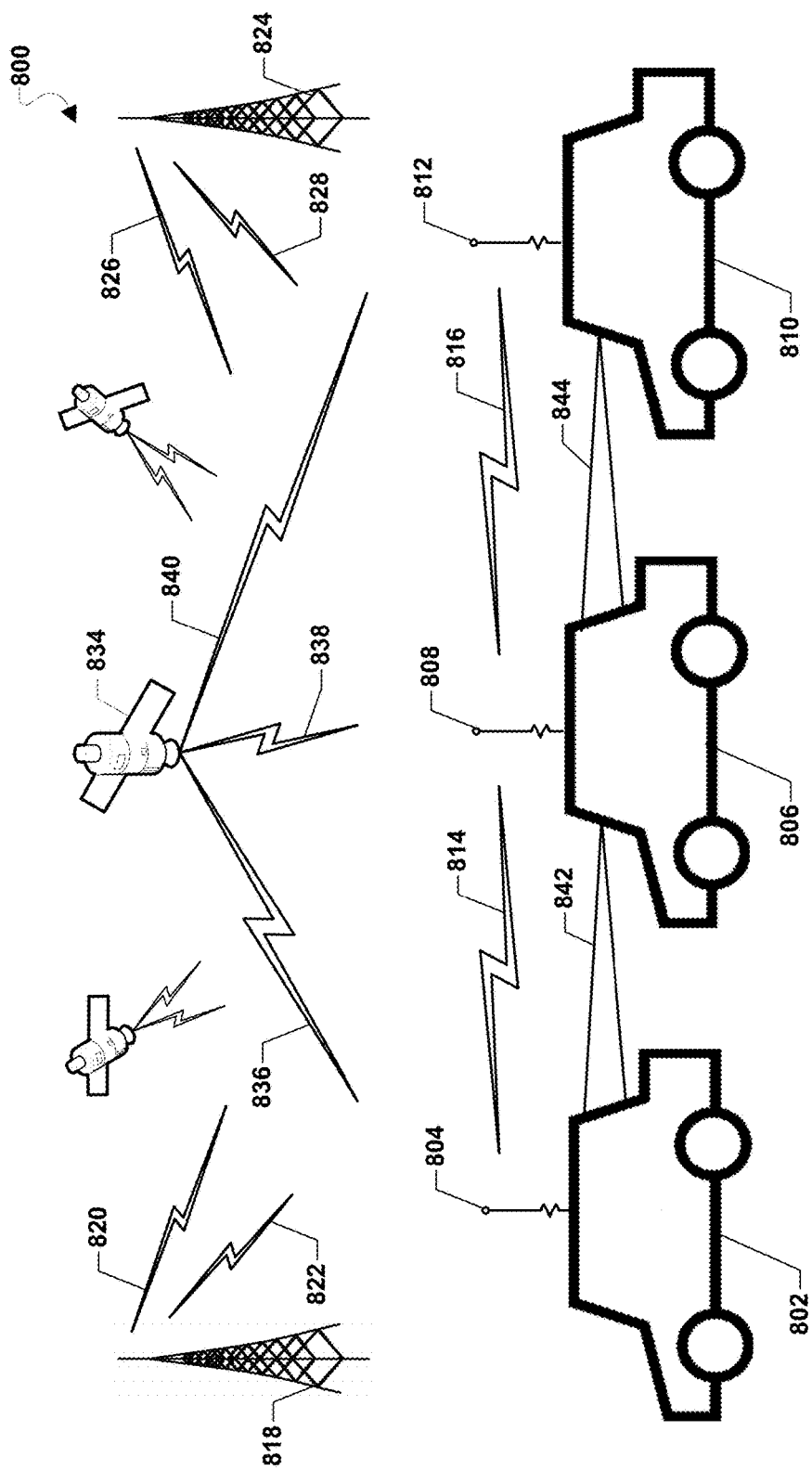
FIG. 10 is a system block diagram of a communication system including vehicles capable of autonomous operation according to various embodiments.

FIG. 10 illustrates a system block diagram of a communication system 800 including a plurality of vehicles capable of autonomous operation according to various embodiments. With reference to FIGS. 1-10, the communication system 800 may include a plurality of vehicles 802, 806, 810 capable of autonomous operation. In some embodiments, vehicles 802, 806, 810 may include components of the vehicles 101, 103, and/or 202.

In particular, FIG. 10 illustrates a first autonomous vehicle 802 equipped with a first antenna 804, a second autonomous vehicle 806 equipped with a second antenna 808, and a third autonomous vehicle 810. While the first, second, and third autonomous vehicles 802, 806, and 810, are each illustrated as including one antenna 804, 808, and 812, the first, second, and third autonomous vehicles 802, 806, and 810 may include a plurality of antennas where each of the first, second, and third autonomous vehicles 802, 806, and 810 may be configured to communication using a plurality of different radio access technologies.

For example, the first autonomous vehicle 802 may be in communication with one or more satellites 834 via communication link 836, a first base station 818 via communication links 822 and/or 820, a second base station 824 via communication links 826 and/or 828, and the second autonomous vehicle 806 via communication link 814. The second autonomous vehicle 806 may be in communication with one or more satellites 834 via communication link 838, a first base station 818 via communication links 822 and/or 820, a second base station 824 via communication links 826 and/or 828, the first autonomous vehicle 802 via communication link 814, and/or the third autonomous vehicle 810 via communication link 816. The third autonomous vehicle 810 may be in communication with one or more satellites 834 via communication link 840, a first base station 818 via communication links 822 and/or 820, a second base station 824 via communication links 826 and/or 828, and the second autonomous vehicle 806 via communication link 816.

In some embodiments, the satellites 834 may be associated with various satellite constellations that may be operated by or otherwise associated with different controlling entities (e.g., companies, countries, organizations, etc.) In various embodiments, the satellites may be GPS satellites. The communication links 836, 838, 840 associated with the satellites 834 may allow the first, second, and/or third vehicle 802, 806, 810 to obtain highly accurate position coordinates.

The first base station 818 and the second base station 824 may transmit infotainment information to be displayed to an operator of the first, second, and/or third vehicles 802, 806, 810. While the first base station 818 and the second base station 824 are illustrated in FIG. 10 as towers, the first base station 818 and/or the second base station 824 may be any access node for a wireless communication network.

In addition, the first, second, and/or third vehicles 802, 806, 810 may include components for communicating with nearby autonomous vehicles. For example, the first, second, and/or third vehicles 802, 806, 810 may include transceivers configured to communicate using DSRC or other vehicle-to-vehicle communications. With such functionalities, the first, second, and/or third vehicles 802, 806, 810 may exchange messages via communication links 814 and 816.

In various embodiments, when the first, second, and/or third vehicles 802, 806, 810 are within DSRC reception range, each of the first, second, and/or third vehicles 802, 806, 810 may use vehicle-to-vehicle communications to communicate messages that initiate, manage, maintain, and disengage platooning operations between the first, second, and/or third vehicles 802, 806, 810.

Figure 11:
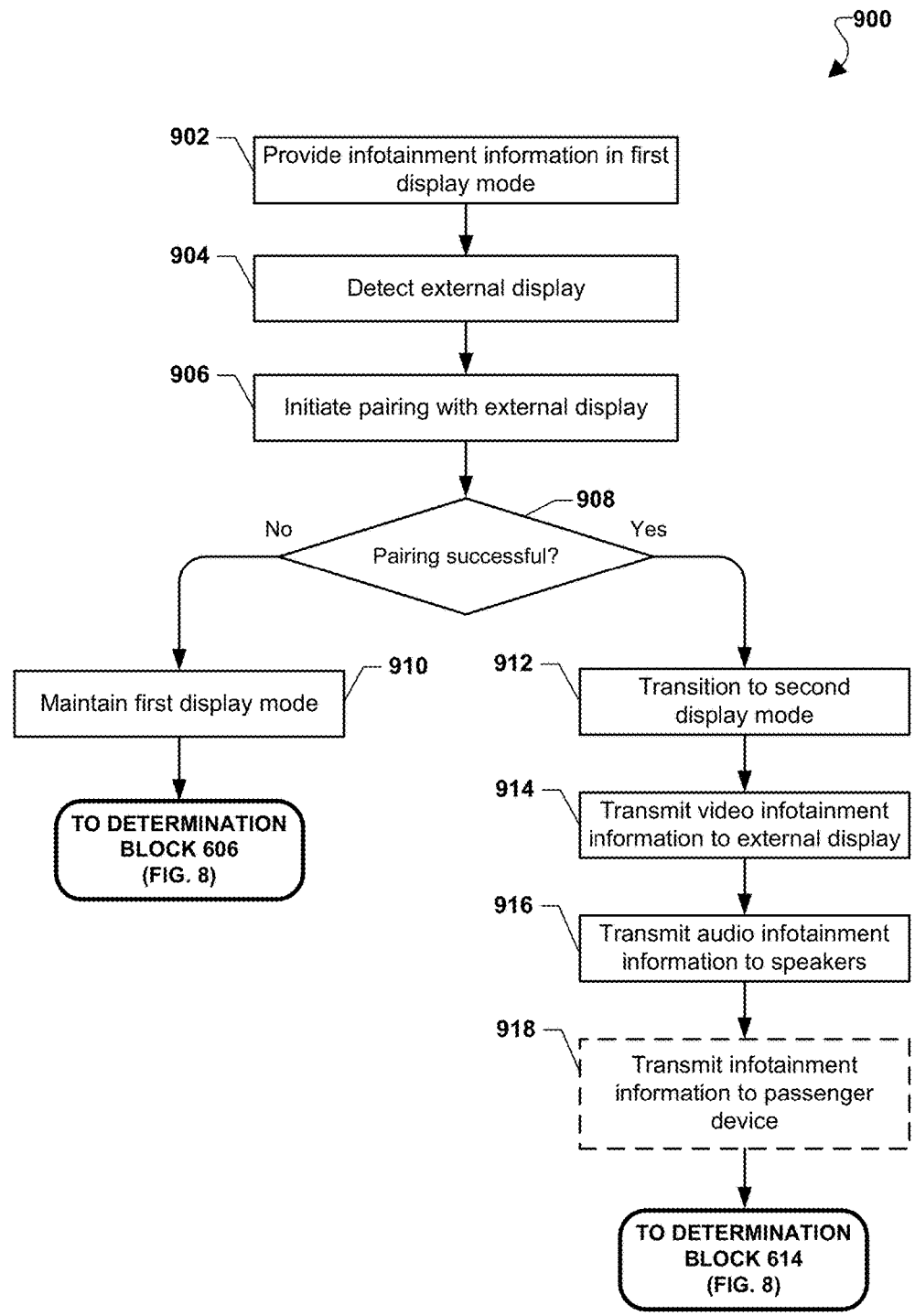
FIG. 11 is a process flow diagram illustrating another method of displaying infotainment information according to various embodiments.

FIG. 11 illustrates a method 900 of displaying infotainment information according to various embodiments. With reference to FIGS. 1-10, the method 900 may be implemented by one or more processors of an infotainment system for a vehicle (e.g., 101, 103, 202, 802, 806, 810).

In block 902, the processor may provide infotainment information to a display during a first display mode. In block 904, the processor may detect an external display (e.g., 324). In some embodiments, the processor may detect the external display or the processor may detect the proximity of another autonomous vehicle and subsequently inquire into whether the proximate vehicle includes an external display.

In block 906, the processor may initiate pairing with the external device. Various pairing techniques may be employed including displaying a challenge code, an alphanumeric string, or a QR code on the external display and/or receiving an input from the operator of the vehicle.

In determination block 908, the processor may determine whether the pairing with the external device is successful. In response to determining that the pairing operation is not successful (i.e., determination block 908="No"), the processor may maintain the first display mode in block 910 and again determine whether a change in awareness state or vehicle operation has been detected in determination block 606 (FIG. 8) as described. In response to determining that the pairing operation is successful (i.e., determination block 908="Yes"), the processor may transition to the second display mode in block 912.

In block 914, the processor may transmit the video portion of the infotainment information to the external device, and in block 916 the processor may transmit the audio portion of the infotainment information to speakers internal to the vehicle (e.g., 322). In addition, in optional block 918, the processor may transmit the infotainment information to one or more passenger devices when one or more passengers are determined to be present. The processor may again determine whether there is a change in vehicle state or operation in determination block 614 (FIG. 8) as described.

In various embodiments, as illustrated in FIG. 10, while the processor is operating in the first display mode, the infotainment information may be displayed such that it is within a field of view 842 or 844 of the operator of the second vehicle 806 and the third vehicle 810, respectively. As previously discussed, the infotainment information may be transmitted to the external display such that the external display renders the infotainment information to be displayed. Alternatively, the infotainment information may be projected onto the first vehicle 802 and/or the second vehicle 806 using a projector installed at the second vehicle 806 and/or the third vehicle 810, respectively. In some embodiments, the processor may determine whether the first, second, and/or third vehicles 802, 806, 810 have initiated a platooning formation prior to providing infotainment information to the operator in the minimum attention display mode in block 902, detecting the external display in block 904, and/or initiating pairing with the external device in block 906.

Figure 12:
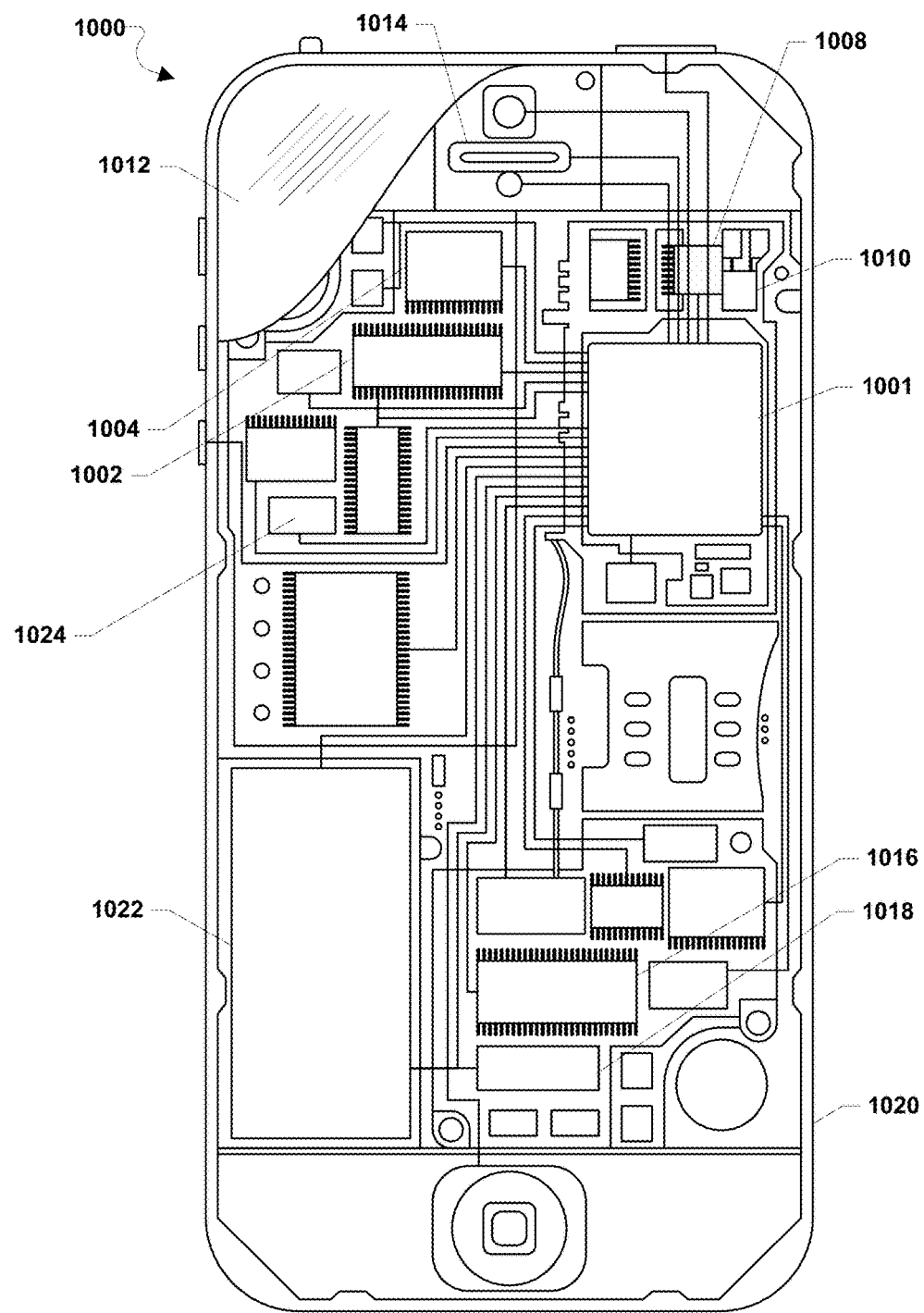
FIG. 12 is a component block diagram of a mobile computing device suitable for use with various embodiments.

The various embodiments (including, but not limited to, embodiments discussed above with reference to FIGS. 1-11) may be implemented in any of a variety of mobile computing devices (i.e. the infotainment computing device 306, the one or more internal display systems 304, the external display system 320, the external display 324, and the computing device 402), an example of which is illustrated in FIG. 12. For example, the mobile computing device 1000 may include a processor 1001 coupled to a touch screen controller 1004 and an internal memory 1002. The processor 1001 may be one or more multicore integrated circuits (ICs) designated for general or specific processing tasks. The internal memory 1002 may be volatile or non-volatile memory, and may also be secure and/or encrypted memory, or unsecure and/or unencrypted memory, or any combination thereof. The touch screen controller 1004 and the processor 1001 may also be coupled to a touch screen panel 1012, such as a resistive-sensing touch screen, capacitive-sensing touch screen, infrared sensing touch screen, etc.

In some embodiments, the mobile computing device 1000 may include one or more radio signal transceivers 1008 (e.g., Peanut®, Bluetooth®, ZigBee®, Wi-Fi, cellular, etc.) and antennae 1010, for sending and receiving, coupled to each other and/or to the processor 1001. The transceivers 1008 and antennae 1010 may be used with the above-mentioned circuitry to implement the various wireless transmission protocol stacks and interfaces. The wireless communication device 1000 may include a cellular network wireless modem chip 1016 that enables communication via a cellular network and is coupled to the processor.

The mobile computing device 1000 may include a peripheral device connection interface 1018 coupled to the processor 1001. The peripheral device connection interface 1018 may be singularly configured to accept one type of connection, or multiply configured to accept various types of physical and communication connections, common or proprietary, such as USB, FireWire, Thunderbolt, or PCIe. The peripheral device connection interface 1018 may also be coupled to a similarly configured peripheral device connection port (not shown).

The mobile computing device 1000 may also include speakers 1014 for providing audio outputs. The mobile computing device 1000 may also include a housing 1020, constructed of a plastic, metal, or a combination of materials, for containing all or some of the components discussed herein. The mobile computing device 1000 may include a power source 1022 coupled to the processor 1001, such as a disposable or rechargeable battery. The rechargeable battery may also be coupled to the peripheral device connection port to receive a charging current from a source external to the mobile computing device 1000.

The mobile computing device 1000 may also include a secure area and/or a trusted execution environment. The trusted execution environment may include one or more processors and/or memory to perform secure operations that are masked from the rest of the elements of the mobile computing device 1000. For example, the trusted execution environment may include a digital rights management (DRM) client or agent such as a content decryption module (CDM) in order to perform operations in a secure environment to reduce the risk of undesired interception of secure data.

The mobile computing device 1000 may also include one or more sensor(s) 1024. The one or more sensor(s) 1024 may be any type of sensor including a proximity sensor, an ambient light sensor, an accelerometer, a near field communication sensor, a gyroscope, a magnetometer, a temperature sensor, a barometric pressure, a color sensor, an ultraviolet sensor, a GPS sensor, etc.

The processor 1001 may be any programmable microprocessor, microcomputer or multiple processor chip or chips that can be configured by software instructions (applications) to perform a variety of functions, including the functions of the various embodiments described above. In some devices, multiple processors may be provided, such as one processor dedicated to wireless communication functions and one processor dedicated to running other applications. Typically, software applications may be stored in the internal memory before they are accessed and loaded into the processor 1001. The processor 1001 may include internal memory sufficient to store the application software instructions. In many devices, the internal memory may be a volatile or nonvolatile memory, such as flash memory, or a mixture of both. For the purposes of this description, a general reference to memory refers to memory accessible by the processor 1001 including internal memory or removable memory plugged into the device and memory within the processor 1001 themselves.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module and/or processor-executable instructions, which may reside on a non-transitory computer-readable or non-transitory processor-readable storage medium. Non-transitory server-readable, computer-readable or processor-readable storage media may be any storage media that may be accessed by a computer or a processor. By way of example but not limitation, such non-transitory server-readable, computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory server-readable, computer-readable and processor-readable media. Additionally, the operations of a method or algorithm may reside as one or any combination or set of codes and/or instructions on a non-transitory server-readable, processor-readable medium and/or computer-readable medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A method of displaying visual infotainment information to an operator of a first vehicle, comprising:
rendering visual infotainment information on a first display when an infotainment system of the first vehicle is operating in a first display mode;
determining whether a change in state or operation of the first vehicle is within a predetermined threshold variance while the infotainment system is operating in the first display mode;
initiating transition from the first display mode to a second display mode in response to determining that the change in state or operation of the first vehicle is within the predetermined threshold variance; and
rendering the visual infotainment information on a second display different from the first display when the infotainment system of the first vehicle is operating in the second display mode in a manner configured to guide the operator's attention to an external environment of the first vehicle.

2. The method of claim 1,
wherein rendering the visual infotainment information on the first display comprises rendering the visual infotainment information on the first display within an interior of the first vehicle, and
wherein the second display is associated with a second vehicle.

3. The method of claim 1, wherein initiating transition from the first display mode to the second display mode comprises:
fading out the visual infotainment information rendered on the first display; and
fading in the visual infotainment information rendered on the second display.

4. The method of claim 3, further comprising modifying an audio portion of the infotainment information provided within the first vehicle.

5. The method of claim 1, wherein initiating transition from the first display mode to the second display mode and rendering the visual infotainment information on a second display different from the first display comprises:
projecting the visual infotainment information from the first vehicle onto a second vehicle using a projector.

6. The method of claim 5, further comprising:
controlling projector to gradually move projected images from a location associated with the first display onto the second vehicle.

7. The method of claim 1, wherein the first vehicle is configured to operate in a manual operation mode and an autonomous operation mode.

8. The method of claim 7, wherein at least one of the first display mode and the second display mode occurs while the first vehicle is operating in the autonomous operation mode.

9. A infotainment system for a vehicle, comprising:
a memory;
a wireless communication interface; and
a processor coupled to the memory and the wireless communication interface, and configured with processor-executable instructions to perform operations comprising:
providing visual infotainment information to be displayed on a first display when the infotainment system is operating in a first display mode;
determining whether a change in state or operation of the vehicle is within a predetermined threshold variance while the infotainment system is operating in the first display mode;
initiating transition from the first display mode to a second display mode in response to determining that the change in state or operation of the vehicle is within the predetermined threshold variance; and
providing the visual infotainment information for rendering to a second display different from the first display when the infotainment system is operating in the second display mode in a manner configured to guide an operator's attention to an external environment of the vehicle.

10. The infotainment system of claim 9, wherein the processor is configured with processor-executable instructions to perform operations such that providing the visual infotainment information to be displayed on the first display when the infotainment system is operating in the first display mode comprises rendering the visual infotainment information on the first display when the infotainment system is operating in the first display mode.

11. The infotainment system of claim 9, wherein the processor is configured with processor-executable instructions to perform operations such that providing the visual infotainment information to be displayed on the first display when the infotainment system is operating in the first display mode comprises transmitting, via the wireless communication interface, the visual infotainment information to the first display for rendering within an interior of the vehicle when the infotainment system is operating in the first display mode.

12. The infotainment system of claim 9, wherein the processor is configured with processor-executable instructions to perform operations such that providing the visual infotainment information to be displayed on the second display different from the first display when the infotainment system is operating in the second display mode comprises providing the visual infotainment information to a projector configured to project the visual infotainment information onto a second vehicle when the infotainment system is operating in the second display mode.

13. The infotainment system of claim 12, wherein the processor is further configured with processor-executable instructions to perform operations further comprising:
controlling the projector to gradually move projected images from a location associated with the first display onto the second vehicle in response to initiating the transition from the first display mode to the second display mode.

14. The infotainment system of claim 9, wherein the processor is configured with processor-executable instructions to perform operations such that providing the visual infotainment information to be displayed on the second display when the infotainment system is operating in the second display mode comprises transmitting, via the wireless communication interface, the visual infotainment information to the second display disposed outside of the vehicle for rendering when the infotainment system is operating in the second display mode.

15. The infotainment system of claim 9, wherein the processor is further configured with processor-executable instructions to perform operations such that initiating transition from the first display mode to the second mode in response to determining that the change in state or operation of the vehicle is within the predetermined threshold variance comprises:
instructing the first display to modify rendering of the visual infotainment information to appear to be fading out; and instructing the second display to initiate rendering of the visual infotainment information to appear to be fading in.

16. The infotainment system of claim 9, wherein the processor is further configured with processor-executable instructions to perform operations further comprising transmitting an audio portion of the infotainment information to one or more speakers when the infotainment system is operating in the first display mode or the second display mode.

17. The infotainment system of claim 16, wherein the processor is configured with processor-executable instructions to perform operations such that initiating transition from the first display mode to the second display mode comprises modifying the audio portion of the infotainment information.

18. The infotainment system of claim 9, wherein the processor is configured with processor-executable instructions to perform operations such that at least one of the first display mode and the second display mode occurs while the vehicle is operating in an autonomous operation mode.

19. An infotainment system for a vehicle, comprising:
means for providing visual infotainment information to be displayed on a first display when the infotainment system is operating in a first display mode;
means for determining whether a change in state or operation of the vehicle is within a predetermined threshold variance while the infotainment system is operating in the first display mode;
means for initiating transition from the first display mode to a second display mode in response to determining that the change in state or operation of the vehicle is within the predetermined threshold variance; and
means for providing the visual infotainment information to be displayed on a second display different from the first display when the infotainment system is operating in the second display mode in a manner configured to guide an operator's attention to an external environment of the vehicle.

20. The infotainment system of claim 19, wherein means for providing the visual infotainment information to be displayed on a second display different from the first display when the infotainment system is operating in the second display mode in a manner configured to guide the operator's attention to an external environment of the vehicle comprises means for projecting the visual infotainment information onto a second vehicle using a projector when the infotainment system is operating in the second display mode.

21. The infotainment system of claim 19, wherein means for providing the visual infotainment information to be displayed on a second display different from the first display when the infotainment system is operating in the second display mode in a manner configured to guide the operator's attention to an external environment of the vehicle comprises means for rendering the visual infotainment information on a display on a second vehicle.

22. A non-transitory processor-readable storage medium having stored thereon processor-executable instructions configured to cause a processor of an infotainment system for a vehicle to perform operations comprising:
providing visual infotainment information to be displayed on a first display when the infotainment system is operating in a first display mode;
determining whether a change in state or operation of the vehicle is within a predetermined threshold variance while the infotainment system is operating in the first display mode;
initiating transition from the first display mode to a second display mode in response to determining that the change in state or operation of the vehicle is within the predetermined threshold variance; and
providing the visual infotainment information for rendering to a second display different from the first display when the infotainment system is operating in the second display mode in a manner configured to guide the operator's attention to an external environment of the vehicle.

23. The non-transitory processor-readable storage medium of claim 22, wherein the stored processor-executable instructions are configured to cause the processor of the infotainment system to perform such that providing the visual infotainment information to be displayed on the first display when the infotainment system is operating in the first display mode comprises rendering the visual infotainment information on the first display when the infotainment system is operating in the first display mode.

24. The non-transitory processor-readable storage medium of claim 22, wherein the stored processor-executable instructions are configured to cause the processor of the infotainment system to perform operations such that providing the visual infotainment information to be displayed on the first display when the infotainment system is operating in the first display mode comprises transmitting, via a wireless communication interface, the visual infotainment information to the first display for rendering within an interior of the vehicle when the infotainment system is operating in the first display mode.

25. The non-transitory processor-readable storage medium of claim 22, wherein the stored processor-executable instructions are configured to cause the processor of the infotainment system to perform operations such that providing the visual infotainment information to be displayed on the second display different from the first display when the infotainment system is operating in the second display mode comprises projecting the visual infotainment information onto a second vehicle using a projector when the infotainment system is operating in the second display mode.

26. The non-transitory processor-readable storage medium of claim 25, wherein the stored processor-executable instructions are configured to cause the processor of the infotainment system to perform operations further comprising controlling the projector to gradually move projected images from a location associated with the first display onto the second vehicle in response to initiating the transition from the first display mode to the second display mode.

27. The non-transitory processor-readable storage medium of claim 22, wherein the stored processor-executable instructions are configured to cause the processor of the infotainment system to perform operations such that providing the visual infotainment information to be displayed on the second display when the infotainment system is operating in the second display mode comprises transmitting, via a wireless communication interface, the visual infotainment information to the second display for rendering outside of the vehicle when the infotainment system is operating in the second display mode.

28. The non-transitory processor-readable storage medium of claim 22, wherein the stored processor-executable instructions are configured to cause the processor of the infotainment system to perform operations such that initiating transition from the first display mode to the second display mode in response to determining that the change in state or operation of the vehicle is within the predetermined threshold variance comprises:

instructing the first display to modify rendering of the visual infotainment information to appear to be fading out; and instructing the second display to initiate rendering of the visual infotainment information to appear to be fading in.

29. The non-transitory processor-readable storage medium of claim 22, wherein the stored processor-executable instructions are configured to cause the processor of the infotainment system to perform operations further comprising transmitting an audio portion of the infotainment information to one or more speakers of the infotainment system when the infotainment system is operating in the first display mode or the second display mode.

30. The non-transitory processor-readable storage medium of claim 29, wherein the stored processor-executable instructions are configured to cause the processor of the infotainment system to perform operations such that initiating transition from the first display mode to the second display mode in response to determining that the change in state or operation of the vehicle is within the predetermined threshold variance comprises modifying the audio portion of the infotainment information.

* * * * *